United States Patent
Nandi et al.

(10) Patent No.: US 9,934,554 B2
(45) Date of Patent: Apr. 3, 2018

(54) ULTRASOUND IMAGING METHOD/TECHNIQUE FOR SPECKLE REDUCTION/SUPPRESSION IN AN IMPROVED ULTRA SOUND IMAGING SYSTEM

(75) Inventors: Debashis Nandi, West Bengal (IN); Sudipta Mukhopadhyay, West Bengal (IN)

(73) Assignee: INDIAN INSTITUTE OF TECHNOLOGY, Kharagpur (IN)

( * ) Notice: Subject to any disclaimer, the term of this patent is extended or adjusted under 35 U.S.C. 154(b) by 294 days.

(21) Appl. No.: 13/885,475

(22) PCT Filed: Nov. 15, 2011

(86) PCT No.: PCT/IN2011/000789
§ 371 (c)(1),
(2), (4) Date: Jun. 4, 2013

(87) PCT Pub. No.: WO2012/066568
PCT Pub. Date: May 24, 2012

(65) Prior Publication Data
US 2013/0243296 A1    Sep. 19, 2013

(30) Foreign Application Priority Data
Nov. 15, 2010   (IN) .......................... 1296/KOL/2010

(51) Int. Cl.
*G06K 9/00* (2006.01)
*G06T 5/00* (2006.01)
*G01S 7/52* (2006.01)

(52) U.S. Cl.
CPC .......... *G06T 5/002* (2013.01); *G01S 7/52044* (2013.01); *G01S 7/52077* (2013.01); *G06T 2207/10132* (2013.01)

(58) Field of Classification Search
None
See application file for complete search history.

(56) References Cited

U.S. PATENT DOCUMENTS 5,409,007 A * 4/1995 Saunders ............ G01S 7/52028
600/447
5,457,754 A * 10/1995 Han ...................... G06T 7/0012
382/128

(Continued)

FOREIGN PATENT DOCUMENTS

JP    2006051229 A    2/2006

OTHER PUBLICATIONS

Aja-Fernandez et al., "On the estimation of coefficient of variation for anisotropic diffusion speckle filtering", IEEE Trans. on Image Processing (2005) 15(9): 2694-2701.

(Continued)

*Primary Examiner* — Gandhi Thirugnanam
(74) *Attorney, Agent, or Firm* — Merchant & Gould P.C.

(57) ABSTRACT

The present invention relates to an improved ultrasound imaging method/technique for speckle reduction/suppression in an ultra sound imaging system in which scan conversion and speckle reduction is performed simultaneously in the scan conversion stage avoiding any kind of conventional interpolation. An improved method for speckle reduction in an ultrasound imaging system and an improved ultra sound imaging system for speckle reduction is provided in the present invention. The method comprises steps of receiving in a processor means raw data samples as an input comprising image signals with noises from a logarithmic amplifier, processing the received image signals for scan conversion and speckle reduction in the processor means so (Continued)

as to get pixel value from the raw data samples and to perform speckle reduction so as to provide speckle filtered output image.

10 Claims, 23 Drawing Sheets

(56) References Cited

U.S. PATENT DOCUMENTS

| | | | | |
|---|---|---|---|---|
| 5,497,777 A * | 3/1996 | Abdel-Malek | | G01S 7/52028 600/443 |
| 5,538,004 A * | 7/1996 | Bamber | | G01S 7/52044 128/916 |
| 5,653,235 A * | 8/1997 | Teo | | A61B 8/08 600/447 |
| 5,841,889 A * | 11/1998 | Seyed-Bolorforosh | | G01S 7/52046 382/128 |
| 5,961,461 A * | 10/1999 | Mo | | G06T 5/20 600/443 |
| 6,248,073 B1 * | 6/2001 | Gilbert | | A61B 8/56 600/443 |
| 6,454,715 B2 * | 9/2002 | Teo | | A61B 8/06 600/443 |
| 6,517,486 B1 * | 2/2003 | Li | | A61B 8/00 600/443 |
| 7,720,266 B2 * | 5/2010 | Ni | | G01S 7/52034 378/37 |
| 8,021,301 B2 * | 9/2011 | Satoh | | G01S 7/52047 382/128 |
| 2004/0127795 A1 * | 7/2004 | Lin | | G01S 7/52046 600/443 |
| 2005/0043619 A1 * | 2/2005 | Sumanaweera | | G06T 15/08 600/437 |
| 2005/0096544 A1 * | 5/2005 | Hao | | G01S 7/52095 600/447 |
| 2005/0143655 A1 * | 6/2005 | Satoh | | G01S 7/52047 600/443 |
| 2005/0261583 A1 * | 11/2005 | Satoh | | A61B 8/12 600/437 |
| 2007/0071292 A1 * | 3/2007 | Rao | | G06T 5/002 382/128 |
| 2008/0181476 A1 | 7/2008 | Aysal et al. | | |
| 2008/0319317 A1 * | 12/2008 | Kamiyama | | A61B 8/0825 600/443 |
| 2009/0143680 A1 * | 6/2009 | Yao | | G01S 7/52044 600/443 |
| 2009/0240114 A1 * | 9/2009 | Lee | | A61B 5/05 600/300 |
| 2010/0305449 A1 * | 12/2010 | Wegener | | G01S 7/52034 600/459 |
| 2013/0243296 A1 * | 9/2013 | Nandi | | G01S 7/52044 382/131 |

OTHER PUBLICATIONS

Bamber et al., "Adaptive filtering for reduction of speckle in ultrasonic pulse-echo images", Ultrasonics (1986) 24(1): 41-44.
Behar et al., "A new method of spatial compounding imaging", Ultrasonics (2003) 41: 377-384.
Berson et al., "Compound scanning with an electrically steered beam", Ultrasonic Imaging (1981) 3: 303-308.
Chang et al., "Adaptive wavelet thresholding for image denoising and compression", IEEE Trans. on Image Processing (2000) 9(9): 1532-1546.
Chang et al., "Frequency compounded imaging with a high-frequency dual element transducer", Ultrasonic (2010) 50: 453-457.
Czerwinski et al., "Ultrasound speckle reduction by directional median filtering", Proceedings, International Conference on Image Processing (1995) 1: 358-361.
Donoho et al., "De-noising by soft-thresholding", IEEE Trans on Information Theory (1995) 41(3): 613-627.
Dutt et al., "Adaptive speckle reduction filter for log compressed B-scan images", IEEE Trans. on Medical Imaging (1996) 15(6): 802-813.
Dutt, "Statistical analysis of ultrasound echo envelope", Ph.D. Thesis, The Mayo Graduate School (1995). (197 pages).
Fleming et al., "Two dimensional compound scanning-effects of maladjustment and calibration", Ultrasonics (1968): 160-166.
Frost et al., "A model for radar images and its application to adaptive digital filtering of multiplicative noise", IEEE Trans. on Pattern Analysis and Machine Intelligence (1982) 4: 157-166.
Gleich et al., "Wavelet-based SAR image despeckling and information extraction, using particle filter", IEEE on Image Processing (2009) 18(10): 2167-2184.
Gupta et al., "Despeckling of medical ultrasound images using data and rate adaptive Lossy compression", IEEE Trans. on Medical Imaging (2005) 24(6): 743-754.
He et al., "Effects of spatial compounding upon image resolution", IEEE Proceedings, 19th International Conference (1997): 598-600.
Kalaivani et al., "A view on despeckling in ultrasound imaging", International Journal of Signal Processing, Image Processing and Pattern Recognition (2009) 2(3): 85-97.
Krissian et al., "Oriented speckle reducing anisotropic diffusion", IEEE Trans. on Image Processing (2007) 15(5): 1412-1424.
Kuan et al., "Adaptive restoration of images with speckle", IEEE Trans. Acoustics, Speech and Sig. Proc. (1987) 35: 373-383.
Lee, "Speckle analysis and smoothing of synthetic aperture radar images", Computer Graphics and Image Processing (1981) 17: 24-32.
Li et al., "Strain compounding: A new approach for speckle reduction", IEEE Trans. on Ultrasonics Ferroelectrics and Frequency Control (2002) 49(1): 39-46.
Loupas et al., "An adaptive weighted median filter for speckle suppression in medical ultrasonic images", IEEE Trans. on Circuits and Systems (1989) 36(1): 129-135.
Michailovich et al., "Depseckling of medical ultrasound images", IEEE Trans. on Ultrasonics Ferroelectrics and Frequency Control (2006) 53(1).
Park et al., "Speckle reduction for SAR images based on adaptive windowing", IEEE Proceedings, Vision, Image and Signal Processing (1999) 146(4): 191-197.
Perona et al., "Scale-space and edge detection using anisotropic diffusion", IEEE Trans. on pattern Analysis and Machine Intelligence (1990) 4(7): 629-639.
Wagner et al., "Statistics of speckle in ultrasound B-scans", IEEE Trans. on Sonics and Ultrasonics (1983) 30(3): 156-163.
Yu et al., "Speckle reducing anisotropic diffusion", IEEE Trans. on Image Processing (2002) 11(11): 1260-1270.
International Search Report and Written Opinion dated Apr. 2, 2012 for International Application No. PCT/IN2011/000789, International Filing Date Nov. 15, 2011 consisting of 17 pages.
Liyong Ma et al., Kriging Interpolation Based Ultrasound Scan Conversion Algorithm, Information Acquisition, 2006 IEEE, International Conference on, IEEE, PI, Aug. 1, 2006, pp. 489-493.
Liyong Ma et al., Local Activity Levels Guided Adaptive Scan Conversion Algorithm, Engineering in Medicine and Biology Society, 2005, IEEE-EMBS 2005, 27th Annual International Conference of the Shanghai, China, Sep. 1-4, 2005, Piscataway, NJ USA, IEEE, Sep. 1, 2005, pp. 6718-6720.
Jong-Sen Lee, Digital Image Enhancement and Noise Filtering by Use of Local Statistics, IEEE Transactions of Pattern Analysis and Machine Intelligence, IEEE Service Center, Los Alamitos, CA, UA, Vo. 30, No. 2, Mar. 1, 1980, pp. 165-168.
Lee Jong-Sen, Refined Filtering of Image Noise Using Local Statistics, Computer Graphics and Image Processing, Academic Press, New York, US, vol. 15, No. 4, Apr. 1, 1981, pp. 380-389.
Hadhoud M M et al., Adaptive Image Interpolation Based on Local Activity Levels, Radio Science Conference, 2003, NRSC 2003, Proceedings of the Twentieth National, Mar. 18-20, 2003, Piscataway, NJ US, IEEE, Mar. 18, 2003, pp. C4 1-8.

* cited by examiner

Fig. 5(a) Original Phantom Image

Fig. 5(b)(i) After Scan conversion  Fig. 5(b)(ii) Before Scan conversion  Fig. 5(b)(iii) With Scan conversion

Median Filtering

Fig. 5(c)(i) After Scan conversion  Fig. 5(c)(ii) Before Scan conversion  Fig. 5(c)(iii) With Scan conversion

Lee Filtering

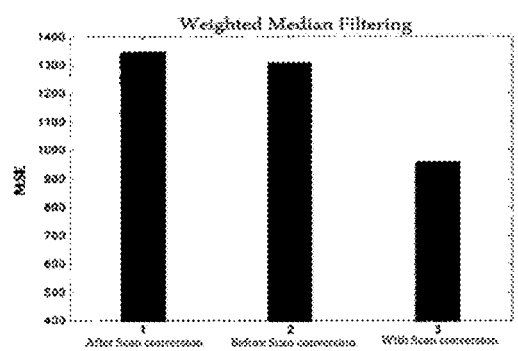
Fig. 6(j)
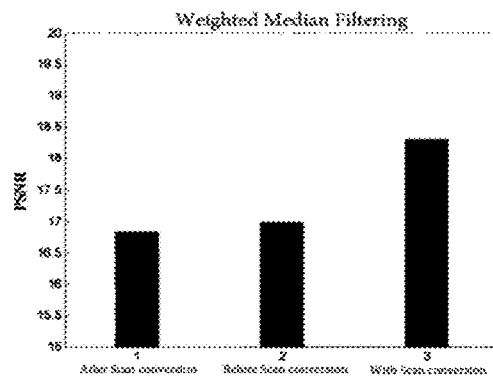
Fig. 6(k)
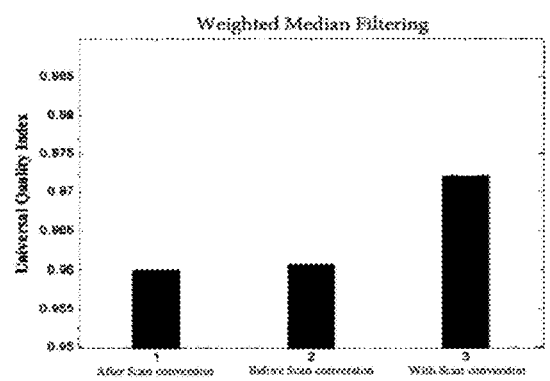
Fig. 6(l)
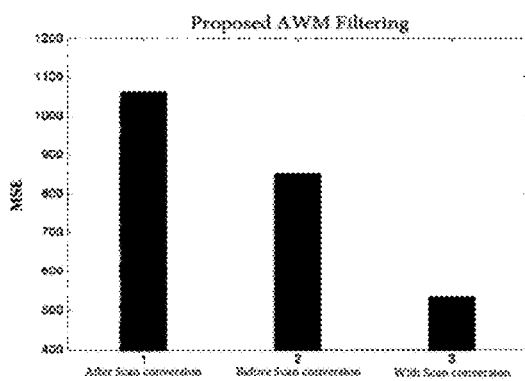
Fig. 6(m)
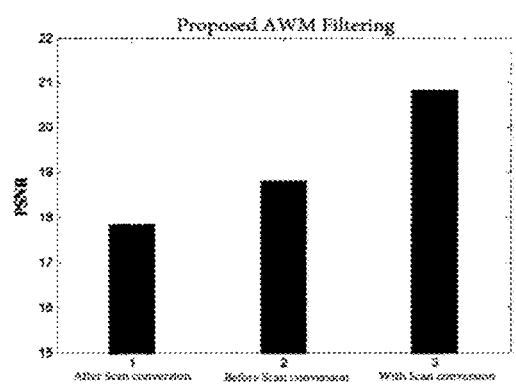
Fig. 6(n)
Figure 6 (continued)

Fig. 7(a) Original Image

Fig. 7(b) After Scan conversion (Median)

Fig. 7(c) Before Scan conversion (Median)

Fig. 7(d) With Scan conversion (Median)

Fig. 7(e) Original Image

Fig. 7(f) After Scan conversion (Lee)

Fig. 7(m) Original Image

Fig. 7(n) After Scan conversion
(Weighted Median)

Fig. 7(o) Before Scan conversion
(Weighted Median)

Fig. 7(p) With Scan conversion
(Weighted Median)

Fig. 7(q) Original image

Fig. 7(r) After Scan conversion
(Proposed AWM)

Fig. 7(s) Before Scan conversion
(Proposed AWM)

Fig. 7(t) After Scan conversion
(Proposed AWM)

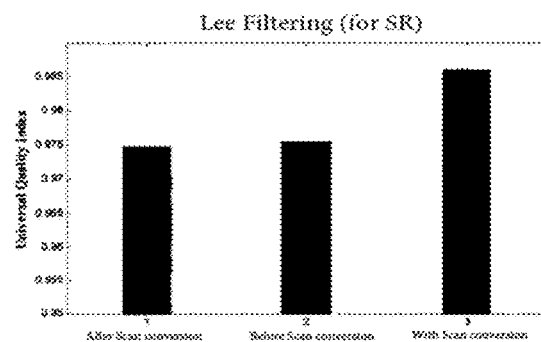
Fig. 8(f)
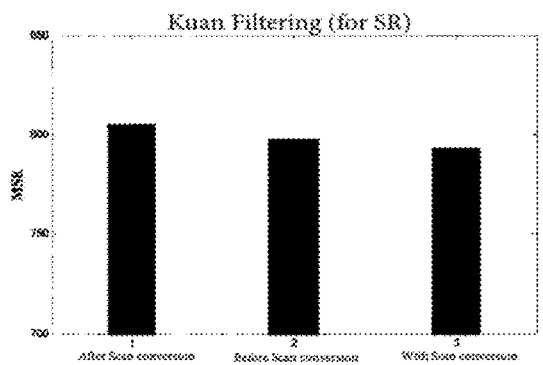
Fig. 8(g)
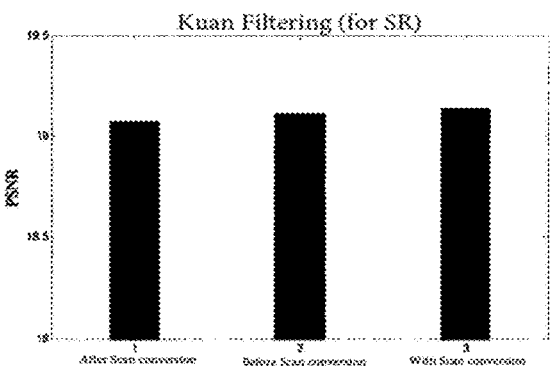
Fig. 8(h)
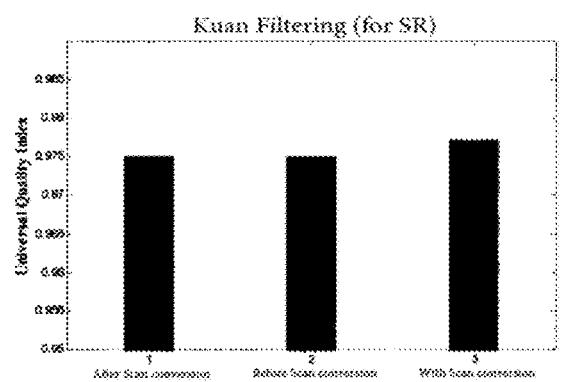
Fig. 8(i)
Figure 8 (continued)

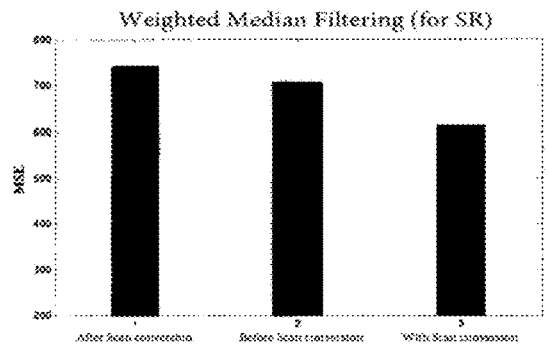
Fig. 8(j)
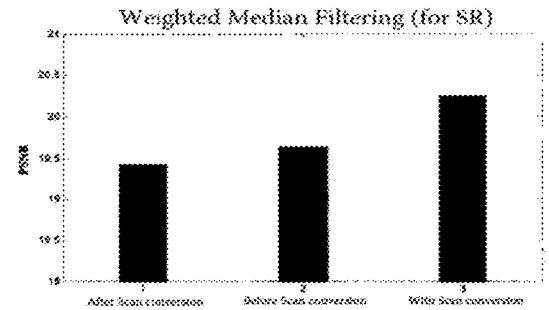
Fig. 8(k)
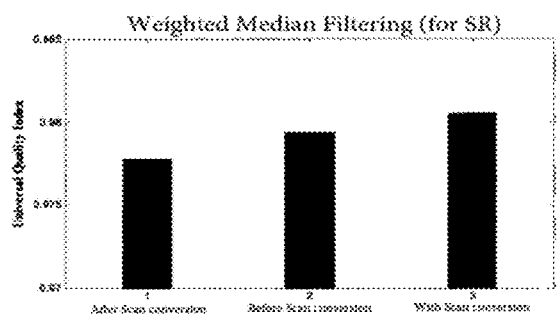
Fig. 8(l)
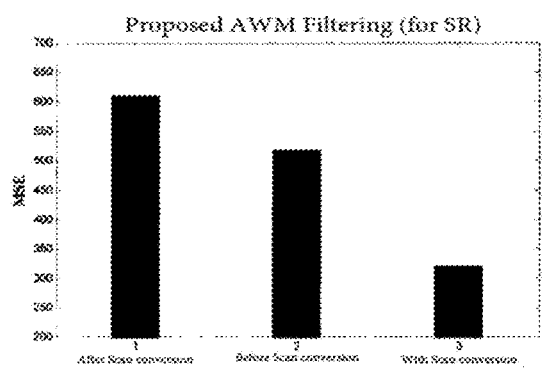
Fig. 8(m)
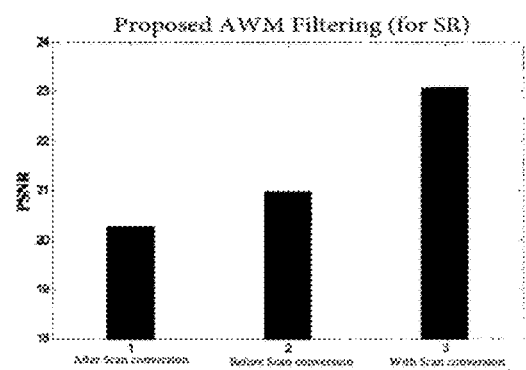
Fig. 8(n)
Figure 8 (continued)

(a) Original image (b) After Scan conversion (Median Filtering)

(c) Before Scan conversion (Median Filtering)

(d) With Scan conversion (Median Filtering)

ULTRASOUND IMAGING METHOD/TECHNIQUE FOR SPECKLE REDUCTION/SUPPRESSION IN AN IMPROVED ULTRA SOUND IMAGING SYSTEM

CROSS REFERENCE TO RELATED APPLICATIONS

This is a U.S. §371 National Phase Patent Application of PCT/IN2011/000789, filed Nov. 15, 2011, which claims priority to Indian Patent Application No. 1296/KOL/2010, filed Nov. 15, 2010, the entirety of which are incorporated herein by reference.

The present invention relates to an improved method for speckle reduction/suppression in an ultra sound imaging system. Particularly, the present invention relates to improved method for speckle reduction where the speckle reduction and scan conversion are performed simultaneously or the speckle reduction is done before scan conversion, preferably speckle reduction and scan conversion being performed simultaneously. More particularly, the present invention relates to an improved method for speckle reduction using an improved filter in said ultra sound imaging system. The invention also relates to an improved ultra sound imaging system having reduced speckles. Further the present invention also includes improved filter for improved speckle reduction in ultra sound imaging system.

BACKGROUND OF THE INVENTION

Ultrasound imaging has got immense importance as diagnostic tool in medical applications for its low cost and non-invasive imaging modality. But the resolutions and speckle noises are the dominant issues, which reduces its utility in some medical diagnostics applications. Many speckle reduction techniques has already been proposed so far. All these techniques are applied either on the raw scan data in pre-processing stage (before scan conversion) or on the scan-converted image as post-processing operation. It is found that the image quality is relatively better if filtering is applied in the preprocessing stage (before scan conversion) rather than post processing stage (after scan conversion). But in this case, the amount of data to be handled is larger. This is true for all the popular types of speckle reduction filters. Furthermore, after noise reduction from raw data, interpolation is performed as part of scan conversion.

Ultrasound imaging modality is one of the most widely used imaging modality in diagnostic medical applications because, it is noninvasive, non-ionizing, real-time, practically harmless to human body, portable and cost effective. Unfortunately, the image quality of medical ultrasound imaging system is limited by some physical phenomena underlying in the acquisition system.

Speckle noise generated in the image is one such limitation. Ultrasound speckle is a quasi-random phenomenon as discloses in Czerwinski, R. N., Jones, D. L., William D. O'Brien, Jr., "Ultrasound Speckle Reduction by Directional Median Filtering", Proceedings, International Conference on Image Processing, Vol: 1, (1995) which occurs due to backscatters ultrasound pulses from the rough surface of the internal soft tissues. Thus ultrasound speckle is similar in origin to laser or radar speckle. It degrades the resolutions, contrast and obscures the underlying anatomy and makes human interpretation and computer-assisted detection techniques difficult and inconsistent as disclosed in Michailovich Oleg V. Tannenbaum Allen, "Despeckling of Medical Ultrasound Images", IEEE Trans. on Ultrasonics Ferroelectrics and Frequency Control, Vol. 53, No. 1, pp. January (2006).

Hence, reduction of speckles is one of the most important challenges to the ultrasound system designers'. Many attempts are made by the engineers and scientists to develop speckle reduction methods during last three decades, and, many techniques have also been developed as taught in Vera Behar, Dan Adam, Zvi Friedman, "A new method of spatial compounding imaging", Ultrasonics 41, pp. 377-384, (2003), Pai-Chi Li and Mei-Ju Chen, "Strain Compounding: A New Approach for speckle reduction", IEEE Trans on Ultrasonics Ferroelectrics and Frequency Control, Vol. 49, No. 1, January (2002), Jong-Sen Lee, "Digital Image Enhancement and Noise Filtering by Use of Local Statistics", IEEE Trans. on Pattern Analysis And Machine Intelligence, Vol. 2, No. 2, March (1980), Gupta N, Swamy M. N. S., Plotkin E., "Despeckling of Medical Ultrasound Images Using Data and Rate Adaptive Lossy Compression", IEEE Trans. on Medical Imaging, Vol. 24, No. 6, pp. 743-754, June (2005). These methods are basically applied either on the raw scan data in the preprocessing stage (i.e. before scan conversion) or on the scan-converted image in the post-processing stage (i.e. after scan conversion).

Basic theory Ultrasound Speckle and speckle statistics: The ultrasound B-scan imaging process is a result of a set of complicated physical phenomena such as absorption, reflection and coherent scattering of ultrasound pulse-echo signal from scattering medium. The back-scattered echo is received and used to display as image. The images, formed by such a process, involve granular structure called speckle. Basically, ultrasound speckle is generated from phasors' summation of coherent scatterings within the resolution cell as it is scanned through the phantom. This phenomenon can be treated geometrically as random walk of component phasors as disclosed in Robert F. Wagner, Stephen W. Smith, John M. Sandrik, H. Lopez, "Statistics of Speckle in Ultrasound B-Scans", IEEE Trans. on Sonics and Ultrasonics, Vol. 30, No. 3, pp. 156-163, May (1983). If the number scatters within resolution cell is large, and the phase of the scattered waves is uniformly distributed within 0 and $2\pi$ independent of amplitude, the envelope of the complex phasor resulting from the summation of the scattered waves exhibits Rayleigh distribution.

The accumulation of the random scatterings can be represented by phasor summation of the scatterings as, $$A = \sum_i a_i e^{j\varphi_i} \quad (1)$$

where each scatterer bears $\alpha_i$ amount of signal and has a phase shift of $\varphi_i$. If $\alpha_i$ and $\varphi_i$ are assumed to be independent and identically distributed, the joint pdf of the real and imaginary component of the complex phasor can be given by central limit theory as, $$p_{A_R A_I}(A_R, A_I) = \frac{1}{2\pi\sigma^2} e^{-\frac{A_R^2 + A_I^2}{2\sigma^2}} \quad (2)$$

where $\sigma^2 = E[A_R^2] = E[A_I^2]$ is the second moments of the real and complex components $A_R$ and $A_I$.

The envelope of the complex phasor can be calculated as, $$a = \sqrt{A_R^2 + A_I^2} \quad (3)$$

Therefore the probability density function of the envelope is given by, $$p(a) = \frac{a}{\sigma^2}e^{-\frac{a^2}{2\sigma^2}}, \quad a \geq 0 \tag{4}$$
$$= 0, \quad \text{otherwise}$$

The function in equation (4) is known as Rayleigh pdf. The speckle pattern formed in the image under Rayleigh distribution is called "fully developed" pattern as disclosed in Dutt V. "Statistical Analysis of ultrasound Echo Envelope", Ph.D. Thesis. Many other speckle statistics such as k-distribution, Rician distribution, Generalized gamma distribution, Weibull distribution, Nakagami distribution etc. are also considered in different literatures.

Most of the literatures of speckle reduction consider the multiplicative noise model for speckle noise as disclosed in Jain A. K., "Fundamentals of digital image processing" Book, Prentice-Hall, Inc and Kuan D. T., Sawchuk Alexander A. et al., "Adaptive restoration of images with speckle," IEEE Trans. Acoustics, Speech and Sig. Proc., Vol. 35, pp. 373-383, March (1987). This multiplicative noise models for speckle is only a rough approximation, and ignore the correlation of the speckle that should be considered in speckle reduction.

Some important and popularly used speckle reduction techniques and the state-of-art briefly are mentioned below:

Speckle reduction techniques can be broadly categorized into three categories:
Compounding
Single scale spatial linear and nonlinear filtering
Multiscale method.
Compounding techniques include
Spatial compounding
Frequency compounding
Strain compounding Underlying philosophy of compounding is the averaging of multiple images of the same target taken either from different positions, or with different frequencies or under different strains.

A number of works has been done on spatial compounding as taught in Fleming J. E. E., Hall A. J., "Two dimensional compound scanning-effects of maladjustment and calibration", pp. 160-166, Ultrasonics, July (1968), Berson M., Roncin A., Pourcelot L., "Compound Scanning with an Electrically Steered Beam", Ultrasonic Imaging 3, pp. 303-308, (1981) and Ping He, Kefu Xuet, Yiwei Wangt, "Effects of Spatial Compounding Upon Image Resolution", Proceedings, 19th International Conference, IEEE/EMBS Oct. 30-Nov. 2, (1997) Chicago, Ill. USA.

In spatial compounding, multiple ultrasound images of a target are acquired by different spatial locations. Speckle in the common region of these images are partially correlated or not correlated. It is known that averaging of multiple images containing partially correlated or uncorrelated noises can reduce the effect of the noise. Hence, speckle can be reduced by forming a composite image averaging the acquired multiple images.

In the frequency compounding, the bandwidth of a radio-frequency (RF) signal is divided into a number of frequency sub-bands. Ultrasound signals from those bands are transmitted to form different images called sub-band images of the same target. A compounding image is, then produced by averaging the sub-band images. Speckles of the sub-band images are less correlated if the bandwidths of the sub-bands are narrower, since it is mainly determined by the difference of center frequencies, which is normalized by a 16 dB pulse envelope length of the sub-band signals as disclosed in Jin Ho Chang, Hyung Ham Kim, Jungwoo Lee, K. Kirk Shung, "Frequency compounded imaging with a high-frequency dual element transducer", Ultrasonics 50, pp. 453-457, (2010).

Strain compounding as disclosed in Pai-Chi Li and Mei-Ju Chen, "Strain Compounding: A New Approach for speckle reduction", IEEE Trans on Ultrasonics Ferroelectrics and Frequency Control, Vol. 49, No. 1, January (2002) exploits the decorrelation between signals under different strain states. Different strain states can be created using externally applied forces as the one used in sonoelastography. Such force produces three dimensional tissue motion. By correcting only in-plane motion, the images acquired under different strain states have similar characteristics except for speckle appearance caused by the uncorrelated out-of-plane motion. These images are combined for speckle reduction with less degradation in the in-plane spatial resolution.

However, all these compounding techniques suffers from different limitations:
They suffer from loss of temporal and/or spatial resolution.
Clinical application of strain compounding is limited
Contrast resolution for small objects may be degraded.
Complexity of the system increases.

Single scale spatial linear and nonlinear filtering: Speckle reduction spatial filters perform smoothing according to local variance and local mean as discussed in different literatures i.e. Jong-Sen Lee, "Digital Image Enhancement and Noise Filtering by Use of Local Statistics", IEEE Trans. on Pattern Analysis And Machine Intelligence, Vol. 2, No. 2, March (1980), Kuan D. T., Sawchuk Alexander A. et al., "Adaptive restoration of images with speckle," IEEE Trans. Acoustics, Speech and Sig. Proc., Vol. 35, pp. 373-383, March (1987), Jong-Sen Lee, "Refined Filtering of Image Noise Using Local Statistics", Computer Graphics And Image Processing 15, pp. 380-389, (1981), Jong-Sen Lee, "Speckle Analysis and Smoothing of Synthetic Aperture Radar Images", Computer Graphics And Image Processing 17, pp. 24-32, (1981), Frost V. S., Stiles J. A., Shanmugan K. S., Holtzman J. C., "A model for radar images and its application to adaptive digital filtering for multiplicative noise," IEEE Trans. on Pattern Analysis And Machine Intelligence, Vol-4, pp. 157-166, March (1982) and Bamber J. C., Daft C., "Adaptive filtering for reduction of speckle in ultrasonic pulse-echo images", Ultrasonic, January (1986).

In the above mentioned filtering, techniques smoothing is increased in homogeneous region of the image and reduced or avoided elsewhere to preserve edges. These filters are basically adaptive filters. Adaptive filtering for reduction of speckle from ultrasonic pulse-echo images was proposed by Bamber J. C., Daft C., "Adaptive filtering for reduction of speckle in ultrasonic pulse-echo images", Ultrasonic, January (1986). It proposed an adaptive two-dimensional filter which uses local features of image texture to recognize and maximally low-pass filter those parts of the image which correspond to fully developed speckle, while substantially preserving information associated with resolved-object structure. The filter is un-sharp masking filter and its output is mathematically given as, $$\hat{x} = \bar{x} + k(x - \bar{x}) \tag{5}$$

where $\hat{x}$ is the new (processed) value of a pixel to be computed from the old (unprocessed) value (x), and the local mean ($\bar{x}$) of the old value's surrounding and including that pixel. The parameter k is controlled by the ratio of the local variance to the local mean. Dutt V., Greenleaf J. F, "Adaptive speckle reduction filter for log compressed B-scan images", IEEE Trans. on Medical Imaging, Vol. 15, No. 6, pp. 802-813, December (1996) discloses the same technique and used the same equation in their literature. But they considered statistics of speckles for log compressed ultrasound image the parameter k was chosen as, $$k = 1 - \hat{f}(\alpha) \tag{6}$$

where $\hat{f}$ is the statistics and given by, $$\hat{f} = \frac{\pi^2}{24} \frac{\hat{D}^2}{V}. \tag{7}$$

Here $\hat{D}$ is an estimate of log compression parameter from the dynamic range and V is the local sample variance.

Jong-Sen Lee, "Speckle Analysis and Smoothing of Synthetic Aperture Radar Images", Computer Graphics And Image Processing 17, pp. 24-32, (1981) proposed a smoothing algorithm based on local statistics on a fixed window size and was successfully applied to remove speckles form SAR images. They considered multiplicative noise model for speckle where the noise is independent to the signal having mean 1 and variance $\sigma_v^2$. The basis of this filter is: in homogeneous region the filtered output is linear average of pixels in the neighborhood, whereas in the region of extremely large intensity variation the output becomes the value of the input pixel itself. The output of the Lee filter is given as, $$\hat{x} = \bar{x} + k(z - \bar{v}.\bar{x}). \tag{8}$$

Here z is the observed pixel, $\bar{v} = 1$, and the value of k is calculated as follows:

$$k = \frac{\text{Var}(x)}{\bar{x}^2 \sigma_v^2 + \text{Var}(x)} \tag{9}$$

$$\bar{x} = \bar{z}$$

and $$\text{Var}(x) = \frac{\text{Var}(z) + \bar{z}^2}{\sigma_v^2 + \bar{v}^2} - \bar{z}^2$$

The quantities $\bar{z}$ and Var(z) are approximated by local mean and local variance of speckle corrupted image.

The main limitation of the Bamber, Dutt, and Lee filters is that the use of too large window introduces a loss of fine details in the image. On the other hand, the use of small window implies insufficient speckle suppression homogeneous region. To avoid this problem adaptive windowing and modified adaptive filtering with variable window size are also proposed in Park J. M., Song W. J., Pearlman W. A., " Speckle Reduction for SAR Images based on adaptive windowing", IEE Proceedings Vol. 146, No. 4, August (1999).

Kuan D. T., Sawchuk Alexander A. et al., "Adaptive restoration of images with speckle," IEEE Trans. Acoustics, Speech and Sig. Proc., Vol. 35, pp. 373-383, March (1987) used same formulation with different assumption of signal model. They assumed that the speckle samples are independent of each other. They derived a local linear minimum mean square (LLMMSE) filter using non-stationary mean and non-stationary variance (NMNV) image model. The correlation properties are also taken into account in their derivation. The parameter k for Kuan filter is determined as, $$k = \frac{\text{Var}(x)}{\text{Var}(x) + \bar{x} + \text{Var}(x)}. \tag{10}$$

The MMSE filter proposed by Frost V. S., Stiles J. A., Shanmugan K. S., Holtzman J. C., "A model for radar images and its application to adaptive digital filtering for multiplicative noise," IEEE Trans. on Pattern Analysis And Machine Intelligence, Vol-4, pp. 157-166, March (1982) is a balance between averaging and all pass filter. The one dimensional impulse response of the MMSE Frost filter is derived as, $$h(t) = A\alpha e^{-\alpha|t|} \tag{11}$$

where A is the normalizing constant and $\alpha$ is the ratio of square root of local variance to local mean of the observed image in a window.

Directional median filter as disclosed in Czerwinski, R. N., Jones, D. L., William D. O'Brien, Jr., "Ultrasound Speckle Reduction by Directional Median Filtering", Proceedings, International Conference on Image Processing, Vol: 1, (1995) and adaptive weighted median filter as disclosed in Loupas T., McDicken W. N., Allan P. L., "An Adaptive Weighted Median Filter for Speckle Suppression in Medical Ultrasonic Images", IEEE Trans. on Circuits and Systems, Vol. 36, No. 1, pp. 129-135, January (1989) are also in use for reducing of speckle due to their robustness and edge preserving capability. These filters are nonlinear filters and produce relatively less blurred image. However, their computational complexity is large.

In many cases Maximum-a-posteriori (MAP) filters are used for speckle reduction. MAP filters require assumption about the distribution of the true process and the degradation model. Different MAP estimators are proposed with different assumptions and different complexities as disclosed in Kalaivani S., Narayanan, Wahidabanu R. S. D., "A View on Despeckling in Ultrasound Imaging", International Journal of Signal Processing, Image Processing and Pattern Recognition Vol. 2, No. 3, pp. 85-97, September (2009).

In Diffusion filtering the nonlinear partial differential equation based smoothing technique utilizing the concept diffusion is proposed by Perona P and Malik J, "Scale-Space and Edge Detection Using Anisotropic Diffusion", IEEE Trans. on Pattern Analysis And Machine Intelligence, Vol. 4, No.-7, pp. 629-639, July (1990). The diffusion is described by, $$\frac{\partial I}{\partial t} = div[c(|\nabla I|)\nabla I] \tag{12}$$

$$I(t = 0) = I_0$$

where div is the divergence operator and | | is the magnitude, c is the diffusion constant and $I_0$ is the initial image. Two diffusion constants are considered as, $$c(x) = \frac{1}{1 + \left(\frac{x}{k}\right)^2} \text{ and}$$

-continued $$c(x) = \exp\left(-\left(\frac{x}{k}\right)^2\right)$$

In the anisotropic diffusion method, the gradient magnitude is used to detect an image edge or boundary as a step discontinuity in intensity.

If $|\nabla I| \gg k$ then $c|\nabla I| \to 0$, and we have all pass filter,

If $|\nabla I| \ll k$ then $c|\nabla I| \to 1$, and we achieve anisotropic diffusion (Gaussian filtering).

An edge sensitive diffusion method called speckle reducing anisotropic diffusion (SRAD) has been proposed to suppress speckle while preserving edge information disclosed in Yongjian Yu and Scott T. Acton, "Speckle Reducing Anisotropic Diffusion", IEEE Trans. on Image Processing, Vol.-11, No.-11, pp. 1260-1270, November (2002). These methods have one common limitation in retaining subtle features such as small cysts and lesions in ultrasound images. A modified SRAD filter, which rely on the Kuan filter rather the Lee filter was developed in Aja-fernandaz S., Alberola-Lopez C., "On the estimation of coefficient of variation for anisotropic diffusion speckle filtering", IEEE Trans. on Image processing, Vol. 15, No. 9, pp. 2694-2701, September (2005) and this approach is called Detail preserving Anisotropic Diffusion (DPAD). This method is combined with matrix anisotropic diffusion method designed to preserve and enhance small vessel structures referred as oriented speckle reducing anisotropic diffusion disclosed in Krissian K. Fedrij C, "Oriented Speckle reducing anosotropicn diffusion", IEEE Trans. on Image Processing, Vol. 15, No. 5, pp. 1412-1424, May (2007).

Multiscale methods include wavelet and pyramid based denoising and discussed in several literatures i.e. David L. Donoho, "De-Noising by Soft-Thresholding", IEEE Trans. on Information Theory, Vol. 41, No. 3, pp. 613-627, May (1995), S. Grace Chang, Bin Yu, Martin Vetterli, "Adaptive Wavelet Thresholding for Image Denoising and Compression" IEEE Trans. on Image Processing, Vol.-9, No.-9, pp. 1532-1546, September (2000), K. P. Soman and K. I. Ramachandran, "Insight into wavelets: From Theory to Practice" PHI (EEE) 2nd Edition, (2005) and Dusan Gleich, Mihai Datcu, "Wavelet-Based SAR Image Despeckling and Information Extraction, Using Particle Filter", IEEE Trans. on Image Processing, Vol. 18, No. 10, pp. 2167-2184, October (2009).

Wavelet denoising attempts to remove whatever noise present and retain whatever signal is present regardless of the frequency content of the signal as mentioned in K. P. Soman and K. I. Ramachandran, "Insight into wavelets: From Theory to Practice" PHI (EEE) 2nd Edition, (2005). It is nothing but shrinkage of wavelet coefficients in wavelet transform domain. Three basic steps are required for wavelet denoising. The steps are as follows:

1. A linear forward wavelet transform,
2. A non-linear shrinking denoising,
3. A linear inverse wavelet transform.

Step1: Calculate the wavelet coefficients of the observed data by applying wavelet transform.

Step2: Modify the detail coefficients to obtain the estimate of the original signal.

Step3: Take the inverse transform of the modified detail coefficient to obtain the denoised signal.

The main challenge of wavelet denoising is the proper choice of shrinkage function and the threshold.

Two categories of thresholding are in use:

Global thresholds: Single threshold ($\lambda$) (is chosen to apply globally to all wavelet coefficient Level dependent threshold: Possibly different thresholds are chosen for each resolution level. One should estimate the noise level ($\sigma$) to determine the threshold. The above two categories of thresholding include hard thresholding and soft thresholding techniques. The thresholding is discussed in brief, Let w be the observed noisy data, $\sigma$ the estimated noise level, $\lambda$ the threshold and $D^\lambda(.)$ denotes the shrinkage function, which determines how threshold is applied to data. Then modified wavelet coefficients can be given as, $$\hat{w} = \sigma \cdot D^\lambda\left(\frac{w}{\sigma}\right) \quad (13)$$

Denoising methods differ in the choices for $D^\lambda(.)$, $\lambda$ and $\sigma$. Different denoisers consider different shrinkage functions that determine how the threshold is applied, different noise estimates and different shrinkage rules to determine the threshold $\sigma$. A few shrinkage functions, which are generally used for denoising, are listed below:

$$\text{Hard threshold: } D_H^\lambda(w) \begin{cases} w, & \text{for all } |w| > \lambda \\ 0, & \text{otherwise} \end{cases} \quad (14)$$

$$\text{Soft threshold: } D_S^\lambda(w) = \text{sign}(w)\max(0; |w| - \lambda) \quad (15)$$

$$\text{Garrot: } D_G^\lambda(w) \begin{cases} \left(w - \frac{\lambda^2}{w}\right), & \text{for all } |w| > \lambda \\ 0, & \text{otherwise} \end{cases} \quad (16)$$

$$\text{Semisoft } D_{SS}^\lambda(w) \begin{cases} 0, & \text{for } |w| \le \lambda_1 \\ \text{sign}(w)\frac{\lambda^2(|w| - \lambda_1)}{\lambda_2 - \lambda_1}, & \text{for } \lambda_1 < |w| < \lambda_2 \\ w, & \text{for } |w| > \lambda_2 \end{cases} \quad (17)$$

The VisuShrink was proposed as a global rule for one-dimensional signals as disclosed in David L. Donoho, "De-Noising by Soft-Thresholding", IEEE Trans. on Information Theory, Vol. 41, No. 3, pp. 613-627, May (1995). Regardless of the shrinkage function, for a signal size n, with noise from a standard normal distribution N(0,1), the threshold is, $$\lambda_U = \sqrt{2\log(n)} \quad (18)$$

If data is not normalized w.r.t noise-standard deviation, first the $\sigma$ using the equation below is estimated $$\sigma = \frac{\text{median}\{\{|w_k| : k = 1, 2, 3 \ldots \frac{n}{2}\}\}}{0.6745}, \quad (19)$$

VisuShrink is found to yield an overly smoothed estimate. This is because the universal threshold (UT) is derived under the constraint that with high probability the estimate should be at least as smooth as the signal. So the UT tends to be high for large values of n, killing many signal coefficients along with the noise. Thus, the threshold does not adapt well to discontinuities in the signal.

The SureShrink for 1-D data, thresholds derived by minimizing Stein's Unbiased Risk Estimate (SURE) depends on the multiresolution level. It can be generalized to 2-D images in either level or subband dependent manner. The threshold on subband s is:

$$\lambda_S = \arg_{\lambda \ge 0}{}^{min}[\text{SURE}(\lambda, w_s)] \quad (21)$$

If wavelet decomposition is sparse a hybrid method combining the universal and SURE threshold is preferable over SURE as disclosed in David L. Donoho, "De-Noising by Soft-Thresholding", IEEE Trans. on Information Theory, Vol. 41, No. 3, pp. 613-627, May (1995). The hybrid method when combined with the soft shrinkage function is referred to as SureShrink in the literature. SureShrink is subband adaptive and a separate threshold is computed for each detail subband. The threshold is also determined for each sub-band assuming a Generalized Gaussian Distribution (GGD) for the wavelet coefficients in each detail sub-band as disclosed in S. Grace Chang, Bin Yu, Martin Vetterli, "Adaptive Wavelet Thresholding for Image Denoising and Compression" IEEE Trans. on Image Processing, Vol.-9, No.-9, pp. 1532-1546, September (2000). The threshold is determined by minimizing Bayes Risk. The pdf associated with GGD is given by, $$p(x) = \left[\frac{v\eta(v, \sigma)}{2\Gamma\left(\frac{1}{v}\right)}\right]\exp\{-[\eta(v, \sigma)|x|^v]\} \quad (22)$$

where $$\eta(v, \sigma) = \sigma^{-1}\left[\frac{\Gamma\left(\frac{3}{v}\right)}{\Gamma\left(\frac{1}{v}\right)}\right]^{\frac{1}{2}}.$$

Here $v$ is the shape parameter $v$ describing the exponential rate of decay and $\sigma$ is the standard deviation. Assuming such a distribution for the wavelet coefficients, we empirically estimate $v$ and $\sigma$ for each subband and try to find the threshold T, which minimizes the Bayes Risk as follows:

$$R(T) = E(\hat{X}-X)^2 = E_X E_{Y/X}(\hat{X}-X)^2 \quad (23)$$

where $\hat{X} = \eta_T(Y)$, $Y/X \sim N(x,\sigma^2)$ and $X \sim p(x)$, $\eta_T(x) = \text{sign}(x)\max(|x|-T,0)$ The optimal threshold T* is given by, $$T^* = \underset{T}{\operatorname{argmin}} R(T) \quad (24)$$

T* can be evaluated as, $$T^* = \frac{\hat{\sigma}^2}{\hat{\sigma}_X^2} \quad (25)$$

where $$\hat{\sigma} = \frac{\text{median}(|Y_{ij}|)}{0.6745},$$

$Y_{ij} \in$ Subband $HH_1$, $\hat{\sigma}_X^2 = \sqrt{\max(\sigma_Y^2 - \hat{\sigma}^2, 0)}$ and $$\sigma_Y^2 = \frac{1}{n^2}\sum_{i,j}^n Y_{ij}^2$$

BayesShrink performs better than SureShrink in terms of MSE. The reconstruction using BayesShrink is smoother and more visually appealing than the one obtained using SureShrink. Many other types of wavelet thresholding are there in different literature. Two major limitations of transform domain shrinkage methods are that they exhibit (a) pseudo-Gibbs and (b) fake feature types of artifacts in images corrupted with medium to high levels of noise.

Adaptive weighted median filter (AWM): It is already discussed in several literatures that median filters perform better than the linear spatial filters for speckle reduction in ultrasound images. The adaptive weighted median filter proposed by T. Loupas et al is better than the median filter for its edge preserving capability. Their method of calculating the weights of the median filter is based on the manipulating of the local statistics of the image. According to them, the weight co-efficients of the median filter are adjusted by, $$w(i, j) = \left[w(K+1, K+1) - cd\frac{\sigma^2}{m}\right] \quad (28)$$

where c is the scaling constant, m, $\sigma^2$ are the local mean and variance inside the 2K +1 by 2 K +1 window, d is the distance of the point (i, j) from the center of the window (K +1), K +1) and [x] returns the nearest integer to x.

The problem of this method is the selection of the constant c and the center weight w(K+1, K+1), which influence the results. No definite method is given to determine the value of these quantities.

US20070071292 discloses image processing adapts to speckle. Speckle is identified from signal transitions. For example, peaks, valleys or mean crossings of image signals as a function of space or spatial location are identified. A speckle characteristic, such as speckle size, is estimated from the signal transitions. The estimation may be limited to soft tissue regions to reduce the effects of specular targets and noise on speckle estimation. The speckle is estimated for local regions or an entire image. By estimating speckle for local regions, image processing may account adaptively for regional variation in speckle size.

US20090240144 discloses systems and methods for suppressing speckle noise in ultrasound imaging. In an embodiment, speckle noise suppression is provided by incoherently summing echo waves that impinge the active aperture of the transducers. This incoherent summation prevents echo waves from destructively interfering and therefore prevents the signal 'nulls' that characterize speckle noise. In an exemplary embodiment, the incoherent summation is performed by sub-dividing a transducer into a plurality of smaller transducers and incoherently summing the electrical signals from the smaller transducers. In one exemplary embodiment, each of the smaller transducers is coupled to a separate rectifier, which rectifies the electrical signal from the respective transducer into a rectified signal. The rectified signals from the rectifiers are then summed to provide the incoherent summation.

U.S. Pat. No. 5,653,235 discloses a system and a method for generating an ultrasound image of an interrogation region in an object with a transducer with a two-dimensional array of transducer elements, includes the steps of generating an ultrasound beam by activating many transducer elements of the two-dimensional array; electronically controlling the beam to illuminate substantially the same region from at least two orientations; capturing the echoes generated with the beam illuminating the object at different orientations; and analyzing the echoes from all directions to produce an image of the region of the object. The aperture of the transducer generating the beam is at least substantially equal to the aperture generated by a linear array of transducer elements extending across the substantially shortest distance between two opposite edges on the two-dimensional array. The ultrasound power emitted from the transducer elements is not spatially uniform, and the multiple echoes reduce speckle in the image.

U.S. Pat. No. 6,517,486 discloses a compounding method for reducing speckle noise applied in an ultrasound imaging apparatus is disclosed. The compounding method includes the steps of providing an object, measuring the object for obtaining a reference image by the ultrasound imaging apparatus, applying an external force to the object to deform the object, measuring the deformed object for obtaining an deformed object image at the same position, estimating an in-plane displacement field of the deformed object image for correcting an in-plane motion of the object to obtain a corrected image, and compounding the reference image with the corrected image to obtain a compounded image of the object for achieving the speckle noise reduction.

U.S. Pat. No. 5,497,777 discloses the enhancement of ultrasound images is provided through the filtering of signal dependent noise such as speckle noise by dividing the signal into selective subintervals and utilizing discrete wavelet transform and the identification and selection of those wavelet transform coefficients primarily including signal and not those primarily including signal dependent noise.

U.S. Pat. No. 5,409,007 discloses a method for reducing speckle artifact in an ultrasound image using a two-dimensional median filter having a diamond-shaped five-point kernel. The entire pixel image data is passed through the filter in a manner such that the center point of the kernel is effectively stepped down each range vector in sequence. The magnitudes of the pixel data at each of the five points in the kernel are compared and the value which has the middle magnitude is adopted as a new pixel value, which is substituted for the old pixel value at the center point. After a new filtered vector has been formed from the new pixel values produced at successive center points by stepping down one acoustic vector, the kernel is shifted by one vector and stepped down range again. This process continues through the entire set of vectors until a new set of filtered vectors is formed. This filter will remove speckle holes on the order of one pixel in size while preserving good edge definition.

U.S. Pat. No. 6,454,715 discloses a methods and apparatus for blood speckle detection for enhanced intravascular ultrasound imaging. The present invention utilizes the fact that the energy scattering strength from blood exhibits a high frequency dependency, while the scattering strength from tissue lacks a strong frequency dependency. In specific embodiments, the present invention may provide a particularly simple and useful solution for addressing the problem of blood speckle in intravascular ultrasound imaging, especially in situations where the blood may have a scattering strength similar to that of tissue and/or where the blood is moving slowly or not at all.

US 20040127795 discloses a method and apparatus for smoothing speckle pattern and increasing contrast resolution in ultrasound images is provided. Compared to other frequency compounding techniques, wide-band harmonic frequency compounding reduces speckle noise without sacrificing the resolution. Compared to spatial compounding, wide-band harmonic frequency compounding is more robust against tissue motion because sequential vectors rather than frames are summed together for compounding. The method and apparatus is implemented by transmitting two or more firings, combining two or more of the firings coherently to extract the tissue-generated harmonic components, detecting the outputs of the coherent sums and detecting one or more firings before coherent sum, and finally combining all detected outputs to form the compounded image. The method and apparatus sums wide-band fundamental and wide-band harmonic images after detection to form a compounded image. Unlike other frequency compounding methods, both transmit and receive signals are wide-band and no narrow-band filters are necessary. Multiple firings with two or more different transmit waveforms are transmitted to each focal zone.

US 20070065009 discloses a method for enhancing an ultrasound image is provided, wherein the ultrasound image is segmented into a feature region and a non-feature region, while sufficiently utilizing features contained in the ultrasound image, in particular including some inconspicuous features. The enhanced image according to present invention is not susceptive of the image segmentation and avoid dependence of the enhancement effect on the segmentation template, so as not to produce an evident artificial boundary between the feature region and the non-feature region but to highlight some special information in the image and to remove or mitigate invalid information. Thus the enhanced ultrasound image is particularly suitable for the visual system of the human beings.

US 20080181476 discloses a methods and systems for enhancing an image exhibiting speckle noise are provided. An image exhibiting the speckle noise is received and a coefficient of variation is estimated in a part of the received image. Either a detail tuning parameter or a smooth tuning parameter are selected based on the estimated coefficient of variation. A maximum likelihood (ML) filter is configured with the selected tuning parameter and the configured ML filter is applied to the part of the received image.

U.S. Pat. No. 7,720,266 discloses a method for enhancing an ultrasound image is provided, wherein the ultrasound image is segmented into a feature region and a non-feature region, while sufficiently utilizing features contained in the ultrasound image, in particular including some inconspicuous features. The enhanced image according to present invention is not susceptive of the image segmentation and avoid dependence of the enhancement effect on the segmentation template, so as not to produce an evident artificial boundary between the feature region and the non-feature region but to highlight some special information in the image and to remove or mitigate invalid information. Thus the enhanced ultrasound image is particularly suitable for the visual system of the human beings.

The drawbacks of the above mentioned prior art is that the amount of data to be handled during speckle reduction is large and thus increases complexity. Furthermore, after noise reduction from raw data, interpolation is to be done for scan conversion, which further increases complexity. The Conventional interpolation is a complex technique for the reduction of speckle in ultra sound imaging. The computational complexity and the number of building blocks are more in case of the above mentioned prior art. The interpolation stage in the prior art increases the loss of information and does not provide better output image quality. The prior art systems and method cannot be used with SR (super resolution) ultrasound image reconstruction techniques.

Thus there is a need to provide an improved ultrasound imaging method/technique for speckle reduction/suppression in an ultra sound imaging system that does not require any conventional interpolation during scan conversion and can be also implemented with Ultrasound SR reconstruction technique from polar format data. Further to provide better image quality by removing speckles and preserving edges.

Further reducing the overall computational complexity and the number of building blocks of conventional ultrasound imaging system and it can be used with SR ultrasound image reconstruction techniques.

Scan conversion means evaluating the pixel values at the grid points in rectangular co-ordinate system. In ultrasound sector scanner the pixel values are available at the grid points in polar co-ordinate system after scanning the object. Conventionally, in scan conversion process the pixel values at the grid points in rectangular co-ordinate system are evaluated by using interpolation techniques using the pixel values available in polar co-ordinate system. This scan conversion makes it possible to display the ultrasound image in video monitor which supports inputs in rectangular co-ordinate system only to display the image. After scan conversion the speckle reduction technique is generally employed to remove the speckle noise from the scan converted image. In the present technique we are avoiding this interpolation.

In conventional techniques, the pixel values at Q are calculated by using a suitable interpolation technique. Here, the values of P are first calculated along radial direction using interpolation technique. After calculation of the pixel values at P, the pixel values at Q are calculated using interpolation technique. This completes the scan conversion process. Speckle reduction is applied after this scan conversion process i.e. the pixel values at the grid points (Q points) in the rectangular co-ordinate points are re-calculated by using the speckle reduction filtering algorithms (e.g. Lee, Kuan, median, weighted median, adaptive weighted median filters etc.). The drawback of this conventional procedure is that the interpolation in the scan conversion stage makes the noise more coloured and the effect of noise is spread from a smaller region to relatively bigger region. Moreover, we lose some information in the scan conversion process due to low pass nature of interpolation operation. This degrades the performance of the conventional procedure. In the present technique, we reduce the loss of information in the in scan conversion process since scan conversion is performed through filtering.

The inventors have found an improved speckle reduction method where the prior speckle reduction techniques can be used to obtain better quality of output image. The inventors have used noise/speckle reduction filter during scan conversion instead of using them after scan conversion. Further the inventors also proposed an improved method for speckle reduction using an improved filter which gives better quality of image if it is applied in old speckle reduction technique. However applying it the improved speckle reduction technique/method provides much better quality of image than that of old speckle reduction technique.

OBJECTS OF THE INVENTION

An object of the present invention is to overcome the problems/disadvantages of the prior art. Another object of the present invention is to provide an ultrasound imaging method for speckle reduction/suppression in ultra sound imaging system adapted to eliminate the interpolation stage in the prior art and hence decrease the loss of information.

Yet another object of the present invention is to provide an improved method for speckle reduction using an improved filter in the said ultra sound imaging system.

Yet another object of the present invention is to provide an improved method for speckle reduction where the speckle reduction and scan conversion are performed simultaneously.

Yet another object of the present invention is to provide an improved method and system where the interpolation step is eliminated in the scan conversion.

Yet another object of the present invention is to provide with an improved system and process for speckle reduction that has simplicity in computation of the speckle reduction, cost effective and high quality ultra sound image.

These and other advantages of the present invention will become readily apparent from the following detailed description read in conjunction with the accompanying drawings.

SUMMARY OF THE INVENTION

In accordance with one aspect of the present invention there is provided an improved method for speckle reduction in an ultrasound imaging system, said method comprising steps of:

receiving in a processor means raw data samples as an input comprising image signals with noises from a logarithmic amplifier;

processing said received image signals for scan conversion and speckle reduction in said processor means so as to get pixel value from said raw data samples and to perform speckle reduction to provide speckle filtered output image;

wherein said speckle reduction and scan conversion are performed/processed simultaneously;

wherein said pixel values at a raster grid points in a rectangular co-ordinate system are determined using filtering technique/speckle reduction technique by means of speckle reduction filter.

In accordance with another aspect of the present invention there is provide an improved ultra sound imaging system for speckle reduction, said system comprising a transducer means;

a transmitter means operatively connected with said transducer means;

a receiver means operatively connected with said a transducer means adapted to get raw data/signal with speckle noise;

a time gain compensation means operatively connected with said receiver means;

a A/D means operatively connected with said time gain compensation means;

a demodulator means operatively connected with said A/D means adapted to provide demodulated data as output from said raw data;

an envelope means operatively connected with said demodulator means comprises envelope detected raw scan data;

a log compression means/logarithm amplification operatively connected with said envelope means adapted to transform said envelope detected raw scan data to log compressed data;

a pre-processing means operatively connected with said log compression means;

a processor means operatively connected with said pre-processing means comprising a scan conversion means and speckle reduction means to get scan converted data;

a post-processing means operatively connected with said processor means;

a display means operatively connected with said post-processing means adapted to display the speckle filtered output image;

wherein said speckle reduction means is placed together/simultaneously with said scan conversion means.

DETAILED DESCRIPTION OF THE INVENTION

The present invention relates to an improved ultrasound imaging method/technique for speckle reduction/suppression in an ultra sound imaging system in which scan conversion and speckle reduction is performed simultaneously in the scan conversion stage or speckle reduction method are used before scan conversion instead of using them after scan conversion avoiding any kind of conventional interpolation. The method reduces the overall complexity of the building blocks of the ultrasound imaging system and enhances the quality of the reconstructed image.

Further the ultrasound imaging system and ultrasound imaging method provide an adaptive weighted based median filter algorithm for speckle reduction, which provide better visual image quality than the other popular spatial filter based speckle reduction techniques.

In the present invention a few quantitative measurement parameters (quality metrics) are employed to compare the reconstructed images generated by different existing popular techniques with the proposed technique.

The present invention provides an improved method for speckle reduction where the speckle reduction and scan conversion are performed simultaneously. (Speckle reduction during scan conversion, preferably during scan conversion instead of using them after scan conversion.)

The present invention further provides an improved system for speckle reduction where speckle reduction method and scan conversion are done simultaneously.

In the new technique the weight co-efficients are determined as follows:

$$w(i, j) = \left[ w(K+1, K+1) - d \frac{20 * \log_{10}(1 + m + \sigma)}{\log_{10}(m)} \right] \quad (29)$$

The proposed high-pass filter considers a trade-off between noise attenuation and edge highlighting. This filter is efficient to enhance the positive-slope edges only. To enhance both the positive and negative edges, the following procedure is used.

1. Calculating weights using equation (29)
2. Evaluating the weighted median of the image pixels within the window using the weights obtained in step 1. This will extract the positive edges.
3. Inverting the pixel values of the window by subtracting the pixels from 255. Then follow the step 2. This will extract the negative edges.
4. Combining the two images obtained from step 2 and step 3 appropriately The above improved adaptive weighted median filtering can be implemented in the preprocessing (before scan conversion) stage, post processing (after scan conversion) stage or along with the scan conversion to show better results than the conventional filtering techniques.

The main features of the present invention are:

The Filtering process is implemented along with scan conversion. It implements spatial linear and non-linear speckle filtering techniques and the conventional interpolation is eliminated.

The ultrasound imaging system and method reduces the overall computational complexity and the number of building blocks of the system. Further it outputs better speckle reduction capability and adaptable with SR ultrasound image reconstruction.

Moreover it focuses on new philosophy of ultrasound image formation, which does not require any conventional interpolation during scan conversion and filtering techniques are implemented along with the scan conversion.

The avoidance of one interpolation stage reduces the loss of information and provides better output image quality and a new adaptive weighted median filter is implemented and adapted with new image formation technique, which is implemented with Ultrasound SR reconstruction technique from polar format data.

According to the first embodiment of the present invention there is provided an improved method for speckle reduction in an ultrasound imaging system. The method comprising steps of receiving in a processor means raw data samples as an input comprising image signals with noises from a logarithmic amplifier, processing the received image signals for scan conversion and speckle reduction in the processor means so as to get pixel value from the raw data samples and to perform speckle reduction so as to provide speckle filtered output image.

The speckle reduction and scan conversion are performed/processed simultaneously. The pixel values at a raster grid points in a rectangular co-ordinate system are determined using filtering technique/speckle reduction technique by means of speckle reduction filter.

Further the step of processing/computation of the pixel value from the raw data as disclosed above comprises steps of determining plurality of radial lines in the rectangular co-ordinate system, determining plurality of rectangular grids comprising vertical and horizontal grid lines in the rectangular co-ordinate system.

Such that the processing the plurality of pixel values from the raw data are at the plurality of points where radial lines cut the horizontal grid lines.

Further step of processing plurality pixel values at each point where radial lines cut the horizontal grid lines comprises determining the plurality of successive radial lines, evaluating plurality of nearest points on the radial lines with respect to point where a radial line cut a horizontal grid line, assigning sample values to the nearest points where the sample values lies substantially around the point where a radial line cut a horizontal grid line, imposing speckle reduction techniques of single scale spatial filter to compute pixel value at the point where a radial line cut a horizontal grid line and performing the above steps to calculate all the pixel values at the plurality of points where the radial lines cut the horizontal grid lines.

The step of processing the pixel value from the raw data at each raster grid point comprises receiving plurality of points where a radial line cut a horizontal grid line from step as disclosed in the above paragraphs, evaluating plurality of nearest points from the points where a radial line cut a horizontal grid line with respect to the raster grid point, assigning sample values to the evaluated nearest points, imposing speckle reduction techniques of single scale spatial filter to compute pixel value at the raster grid point, performing all the above mentioned steps to calculate all the pixel values at the plurality of raster grid points.

The single scale spatial filter comprises linear, non linear filter technique and like.

The speckle reduction filter comprises a high pass filter technique with edge enhancement. The high pass filter technique having weight co-efficient of $$w(i, j) = \text{INT}\left[w(K+1, K+1) - d\frac{20*\log_{10}(1+m+\sigma)}{\log_{10}(m)}\right]$$

to enhance positive edge slope or both positive and negative edge slope.

The step for the filter to enhance both positive and negative edge slope comprises steps of
(i) determining weights with filter technique as mentioned in the equation above;
(ii) evaluating the weighted median of the image pixels within the window using the weights obtained in step 1 adapted to obtain positive edge slops;
(iii) controlling the sharpness in the positive slope directions by control parameter $\delta_1$;
(iv) inverting the pixel values of the window by subtracting the pixels followed by the step 2 adapted extract the negative edges;
(v) controlling the sharpness in the negative slope directions by control parameter $\delta_2$ and
(vi) combining the two images obtained from step ii and step iv.

According to the second embodiment of the present invention there is provided an improved ultra sound imaging system for speckle reduction. the system comprises a transducer means, a transmitter means operatively connected with the transducer means, a receiver means operatively connected with the a transducer means to get raw data/signal with speckle noise, a time gain compensation means operatively connected with the receiver means, a A/D means operatively connected with the time gain compensation means, a demodulator means operatively connected with the A/D means to provide demodulated data as output from the raw data, an envelope means operatively connected with the demodulator means comprises envelope detected raw scan data, a log compression means/logarithm amplification operatively connected with the envelope means to transform the envelope detected raw scan data to log compressed data, a pre-processing means operatively connected with the log compression means, a processor means operatively connected with the pre-processing means comprises a scan conversion means and speckle reduction means to get scan converted data, a post-processing means operatively connected with the processor means and a display means operatively connected with the post-processing means to display the speckle filtered output image. The speckle reduction means is placed together/simultaneously with the scan conversion means.

The processor means receives ultrasound data samples for scan conversion in scan conversion means and speckle reduction in the speckle reduction means so as to get the pixel value from the raw data and to perform speckle reduction and provide speckle filtered output image.

The processor means for processing/computation the pixel value from the raw data comprises a first computing means for computing plurality of radial lines in a rectangular co-ordinate system, a second computing means for computing plurality of rectangular grids comprising vertical and horizontal grid lines in the rectangular co-ordinate system.

The processor means for processing the plurality of pixel values from the raw data are at the plurality of points where radial lines cut the horizontal grid lines. Further the processor means for processing plurality of pixel values from the raw data are at the plurality of raster grid points.

The processor for processing plurality pixel values at each point where radial lines cut the horizontal grid lines where the processor means comprises a scan conversion means. The conversion means comprises a first computing means for computing the plurality successive radial lines, an evaluating means for evaluating plurality of nearest points on the radial lines with respect to the point where a radial line cut a horizontal grid line, an assigning means for assigning sample values to the nearest points where the sample values lies substantially around the point where a radial line cut a horizontal grid line and a speckle reduction means for imposing speckle reduction techniques of single scale spatial filter to compute pixel value at the point where a radial line cut a horizontal grid line.

The processor means for processing the pixel value from the raw data at each raster grid point. The processor means comprises a scan conversion means. the conversion means comprises an inputting means for receiving plurality of points where a radial line cut a horizontal grid line from evaluating means, an evaluating means for evaluating plurality of nearest points from the points where a radial line cut a horizontal grid line with respect to the raster grid point, an assigning means for assigning sample values to the evaluated nearest points and a speckle reduction means for imposing speckle reduction techniques of single scale spatial filter to compute pixel value at the raster grid point.

The speckle reduction filter means comprises linear and non-linear filter and the like. The speckle reduction filter means comprises a high pass filter means.

The high pass filter means having weight co-efficient of $$w(i, j) = \text{INT}\left[w(K+1, K+1) - d\frac{20*\log_{10}(1+m+\sigma)}{\log_{10}(m)}\right]$$

to enhance positive edge slope or both positive and negative edge slope.

The filter means to enhance both positive and negative edge slope comprises
(i) a processor means of filter means for calculating weights with filter means as mentioned in the equation above;
(ii) a evaluating means of filter means for evaluating the weighted median of the image pixels within the window using the weights obtained in step 1 adapted to obtain positive edge slops;
(iii) a first controlling means of filter means adapted for controlling the sharpness in the positive slope directions by control parameter $\delta_1$;
(iv) an inverting means of filter means for inverting the pixel values of the window by subtracting the pixels followed by the step 2 adapted extract the negative edges;
(v) a second controlling means of filter means for controlling the sharpness in the negative slope directions by control parameter $\delta_2$ and
(vi) a combing means of filter means for combining the two images obtained from step ii and step iv.

Advantages:
Avoidance of interpolation reduces the extra loss of information during scan conversion.
A new speckle filtering technique is adapted with the new image formation technique provide better image quality by removing speckles and preserving edges.

It reduces the overall computational complexity and the number of building blocks of conventional ultrasound imaging system.

It can be used with SR ultrasound image reconstruction techniques.

BRIEF DESCRIPTION OF THE ACCOMPANYING DRAWING

Other features as well as the advantages of the invention will be clear from the following description.

Figure 9:
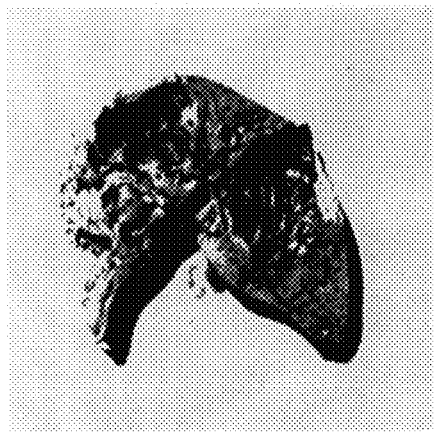
Figure 9:
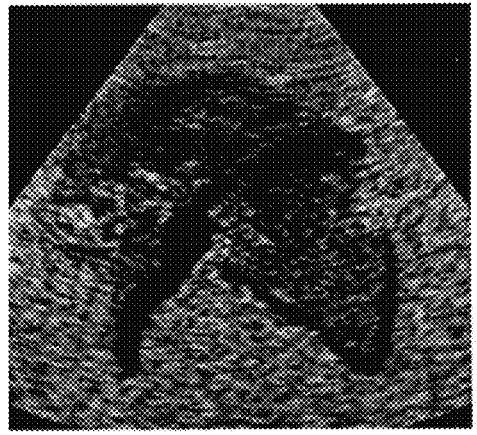
Figure 9:
Figure 9:
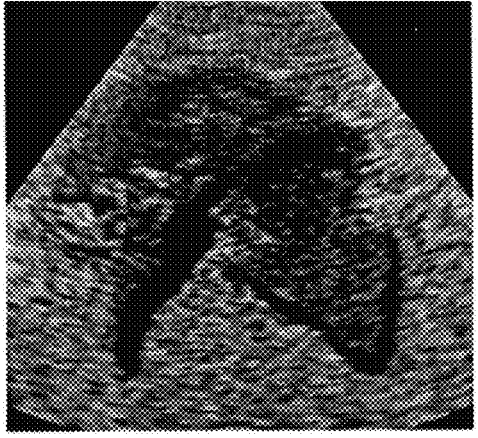

FIG. 9(a), (b) illustrates Final output images by applying median filtering technique on the ultrasound simulated phantom image at different stages.

Figure 10:
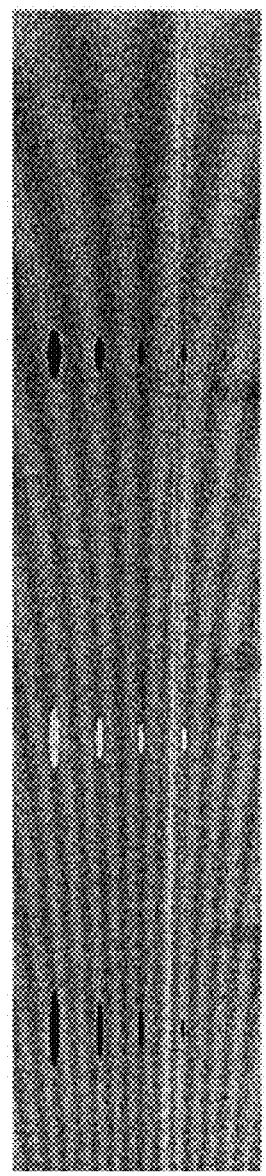

FIG. 10 illustrates Image of the noisy scan data.

Figure 11:
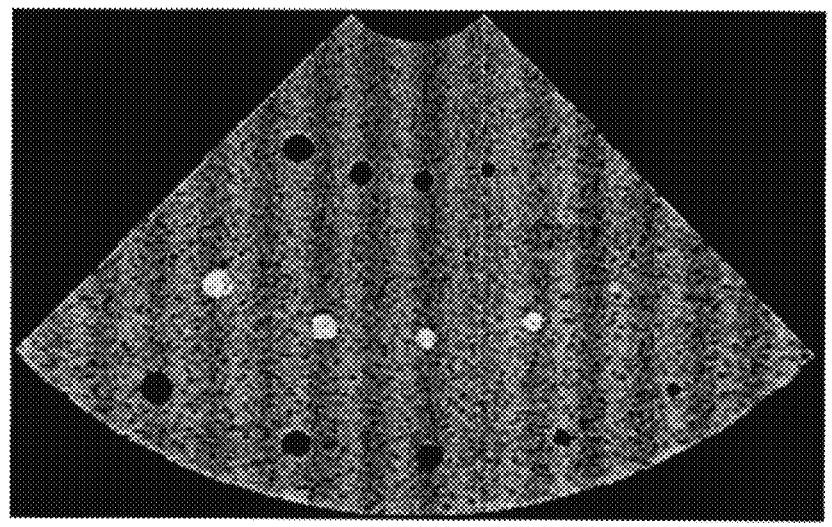

FIG. 11 illustrates Scan converted noisy image after only scan conversion (without filtering).

Figure 12:
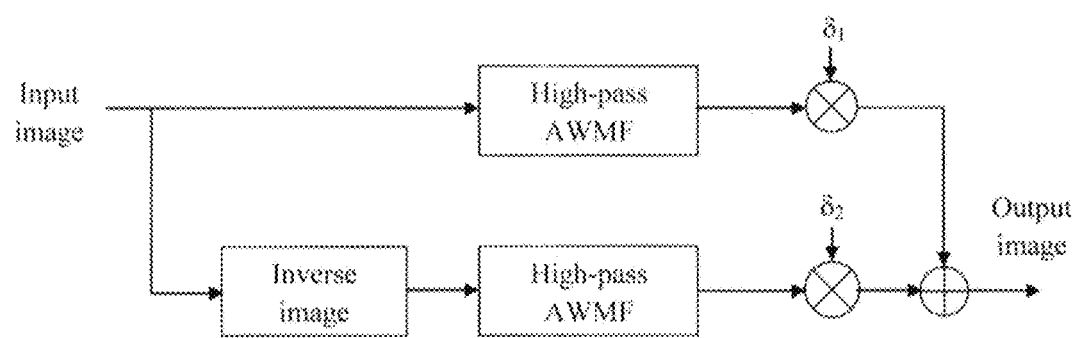

FIG. 12 illustrates High-pass adaptive weighted median filtering with edge enhancement

DETAILED DESCRIPTION OF THE ACCOMPANYING DRAWINGS

In the following detailed description, reference is made to the accompanying drawings that form a part hereof, and illustrate the best mode presently contemplated for carrying out the invention. The invention is described in reference to specific embodiment and such description should not be considered to a limitation of the present invention. However, such description should not be considered as any limitation of scope of the present mechanism. The structure of the system thus conceived is susceptible of numerous modifications and variations, all the details may furthermore be replaced with elements having technical equivalence. In practice the materials and dimensions may be any according to the requirements, which will still be comprised within its true spirit.

Figure 1A:
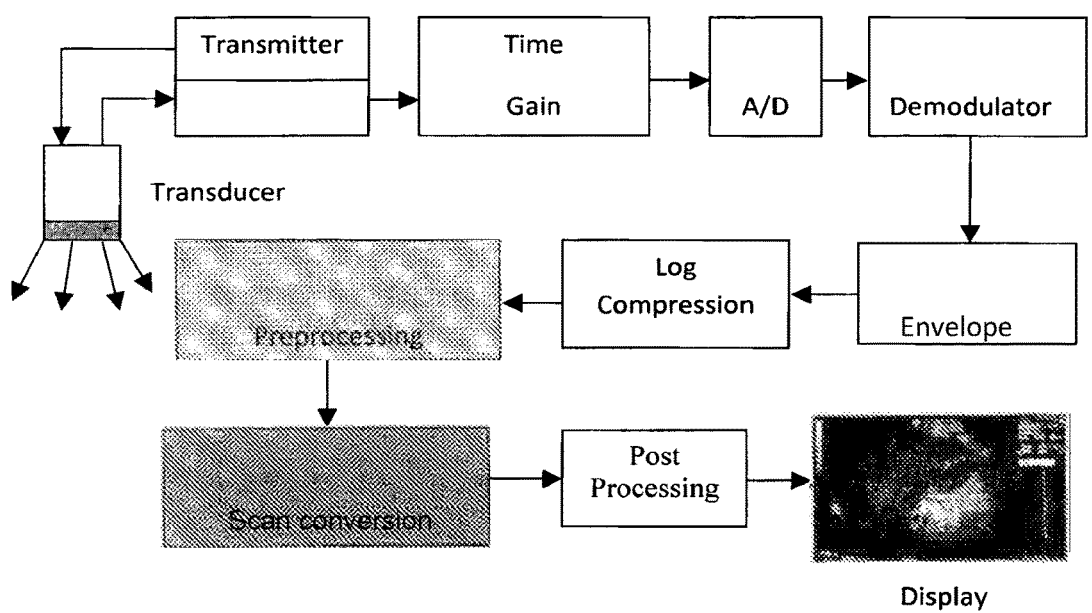
FIG. 1a illustrates schematic Block diagram of B-mode ultrasound imaging system.

FIG. 1a discloses the simplified schematic block diagram of a typical diagnostic conventional B-mode ultrasound imaging system. The speckle reduction filter is employed here after log compression of the demodulated output. Interpolation is then performed on the filtered log compressed signal for scan conversion and the signal is prepared for display after some post processing tasks. The speckle reduction techniques are applied on envelope detected raw scan-data, log compressed data at the preprocessing stage before scan conversion or scan converted data at post-processing stage.

Figure 1B:
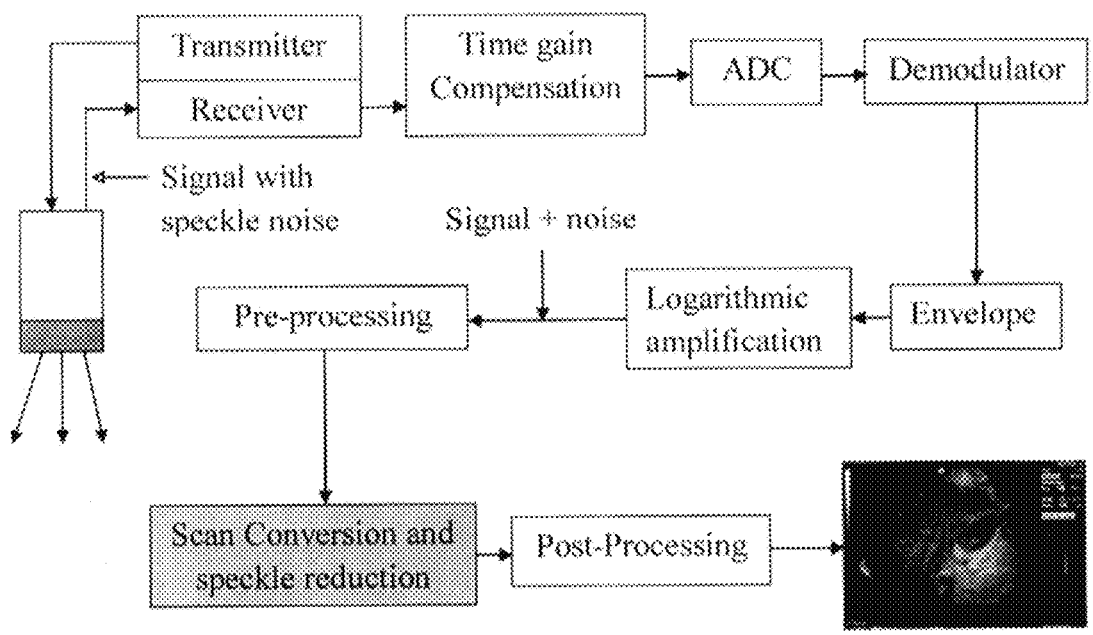
FIG. 1b illustrates schematic block diagram of the proposed speckle reduction technique where scan conversion and speckle reduction is performed simultaneously.

FIG. 1b is the simplified block diagram of the proposed new paradigm of the speckle reduction technique. In the new technique, all the blocks perform same operations as in the case of old conventional technique except the preprocessing, post-processing and the scan conversion block. Here the speckle reduction is shifted from the preprocessing or post-processing block to scan conversion block since speckle reduction is performed simultaneously with scan conversion.

Figure 2:
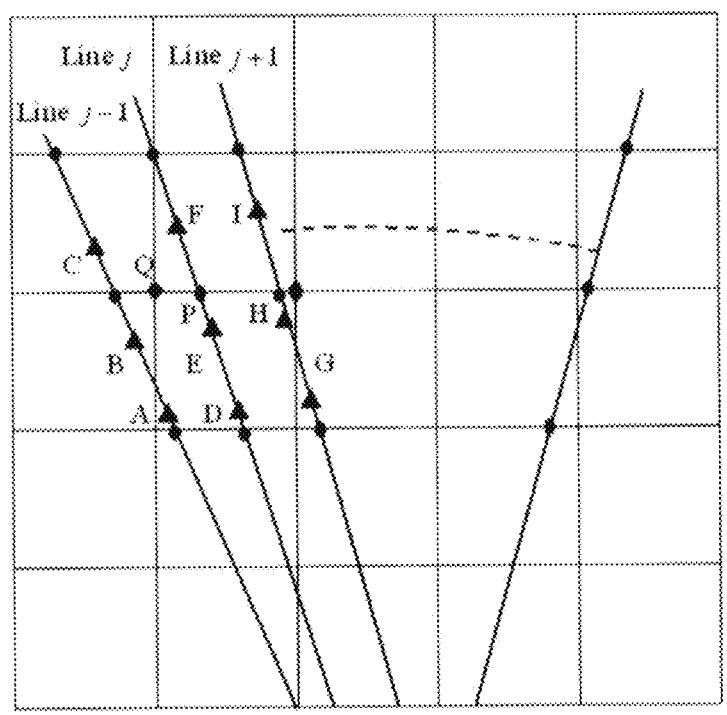
FIG. 2 illustrates scan-conversion geometry.

FIG. 2.: In the present technique/method, the speckle reduction scan conversion method is employed simultaneously avoiding the conventional interpolation. A few so-called single scale spatial speckle-reduction filtering methods (linear and nonlinear such as Lee, Kuan, Median) are chosen to test the performance of the improved method/technique. The method for speckle reduction scan-conversion is described with the help of a diagram of scan-conversion geometry as in FIG. 2. Ultrasound data samples obtained from the logarithm amplifier are placed on rectangular raster along radial lines. A few sample points are placed in FIG. 2 as solid triangular points for the ease of illustration. Now, for scan conversion it needs to be found the pixel value on the rectangular grids from the available data. To perform this, the inventors have first found out the pixel value at the points where radial lines cut the horizontal grid lines. For example, three successive radial lines (Line j−1, Line j, and Line j+1) are considered. The pixel value at point P is found out, where the radial line, Line j cuts the horizontal grid line. The three nearest points around P along the Line j is found. These points are D, E and F. Suppose E is the nearest point of P along Line j. Hence, next two nearest points are F and D, respectively. The nearest sample value as s(nearest, j) is assigned. Consequently, the other two points D and F as s(nearest −1, j) and s(nearest +1, j) respectively is also assigned. In a similar the other six points (A, B, C, G, H and I), three from each Line j−1 and Line j+1 is found out. These six points are: s(nearest−1, j−1), s(nearest, j−1), s(nearest +1, j−1), s(nearest −1, j+1), s(nearest, j+1), s(nearest +1, j+1) respectively. Around the point P we get nine sample values as a local window from which the pixel value at P is calculated.

To calculate the pixel value at P, different single scale spatial filter (linear or nonlinear) based so-called popular speckle reduction algorithm is imposed. For illustration, the Lee filter technique is used. Lee filter technique is already discussed in the literature survey. The parameter k of Lee filter can be determined from the variance and the mean of the local window. Then the pixel value p at the point P can be calculate as, $$p = \bar{s} + k[s(\text{nearest}, j) - \bar{s}] \quad (26)$$

where $\bar{s}$ is the average value of the pixels within the local window. $\bar{s}$ is calculated by adding all the pixel values within the window which contains the pixels designated by s(nearest, j), s(nearest+1, j), . . . etc. as described and dividing the result by the number of the pixels within the windows.

k is different for different linear filtering techniques (such as Lee, Kuan etc.) and it can be calculated from the statistics of the local window. For nonlinear filters such as median, weighted median or adaptive weighted median filters k is not defined. For these filters, the median value is calculated from the pixel values of the local window using simple median calculation technique or weighted median calculation technique and it is mentioned earlier section of this document.

Figure 3:
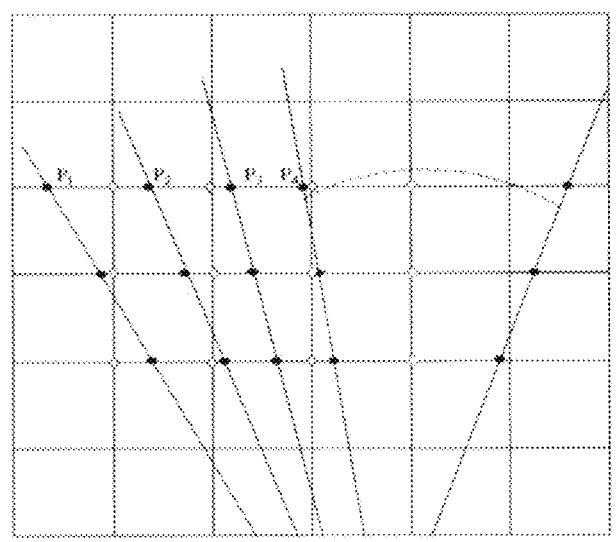
FIG. 3 illustrates geometry of first stage computation

After computation of all the pixel values at the points where radial lines cut the horizontal gridlines, the geometry will be converted as shown in FIG. 3 below: The computed points are denoted as solid circles. $P_1$, $P_2$, $P_3$ . . . are such points.

Now, with available of the points P1, $P_2$, $P_3$ . . . the raster grid points of the raster scan is computed.

Figure 4:
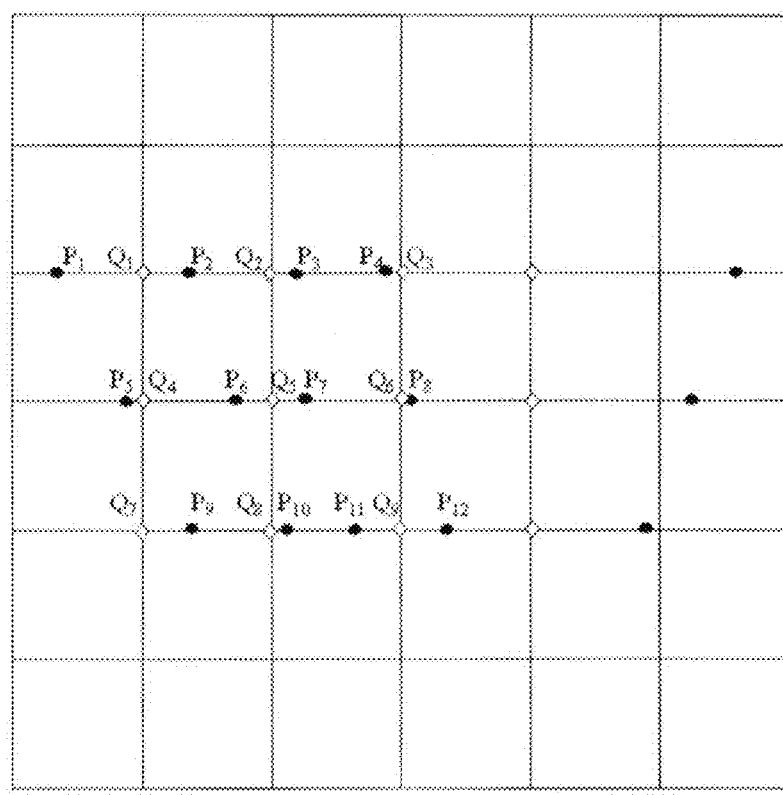
FIG. 4 illustrates pixel geometry for raster grid point computation.

FIG. 4 discloses the procedure of computation of the pixel values at the raster grid points. In FIG. 4, pixel values at the points $P_1$, $P_2$, $P_3$ . . . are already calculated in the first stage. In the next step, the pixel values at the raster grid points $Q_1$, $Q_2$, $Q_3$ . . . etc is computed. In the example the raster grid point $Q_5$ in the $i^{th}$ row and $j^{th}$ column is considered. Also the pixel values at the points $P_k$, k=1, 2, 3 . . . are represented with two index variables is considered. Three nearest points of $Q_5$ along $i^{th}$ row are determined. $P_7$, $P_6$ and $P_8$ are such three nearest points. $P_7$ is the nearest one and $P_6$ and 8 are the next two successive nearest points. The pixel value of $P_7$ as p(i, nearest) is assigned. Then other two nearest points can be assigned as p(i, nearest−1) and p(i, nearest+1), respectively. Similarly, the three nearest points from previous row other three from next row is found out. For finding three nearest points from the previous row i.e. $(i-1)^{th}$ row, the grid point $Q_2$ of the same column and $(i-1)^{th}$ row and search three nearest points around $Q_2$ along the row is found out. These points are assigned as p(i−1, nearest 1), p(i−1, nearest1−1) and p(i−1, nearest1+1). And in a similar way, three nearest points from next row i.e. $(i+1)^{th}$ row is found out. The points as p(i+1, nearest 2), p(i+1, nearest 2−1) and p(i+1, nearest 2+1) are assigned. Finally, the pixel value at the grid point $Q_5$ can be computed from these nine points as $$q = \bar{p} + k[p(i, \text{nearest}) - \bar{p}] \tag{27}$$

where $\bar{p}$ average value of the pixels within the window.

The average value $\bar{p}$ is calculated by adding the pixel values within the windows which are designated by p(i, nearest), p(i, nearest+1), . . . etc. and dividing the result by the number of pixels within the local window.

Different single scale spatial filtering techniques are applied within this improved method where filtering and scan conversion is done simultaneously.

The pixel values at the grid points in rectangular co-ordinate system are calculated using filtering technique from the neighbor pixel values. It fulfills the requirement of scan conversion, and at the same time, it gives the speckle filtered output image. Hence interpolation stage in the scan conversion process is avoided.

In the geometrical portrait, Q points are the grid points in the rectangular co-ordinate system. To generate a speckle filtered ultrasound image that is displayed in the conventional video monitor which supports rectangular co-ordinate system and therefore, first the pixel values at the grid points Q is calculated. To evaluate the values at the pixel points Q, in the present technique the pixel values at the points P is calculated as an intermediate stage using filtering algorithm avoiding interpolation. After calculating the pixel values at the point P the pixel values at Q is calculated by using the pixel values at the points P applying filtering algorithm again.

In the present invention, to evaluate the pixel value of a grid point on the rectangular raster, the nearest pixel value from the raw data is used and the noise reduction algorithm on that nearest pixel value is applied. Hence scan conversion and speckle reduction are performed simultaneously.

Figure 5:
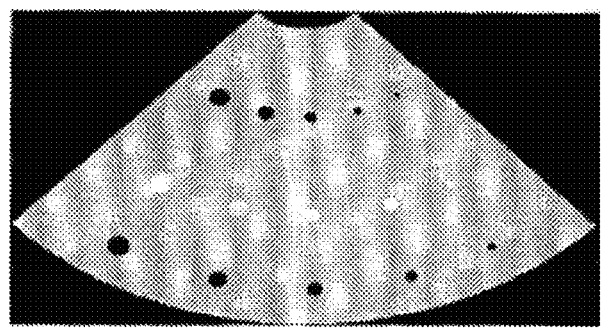
FIG. 5 illustrates reconstructed phantom images in different stages for different filtering methods.
Figure 5:
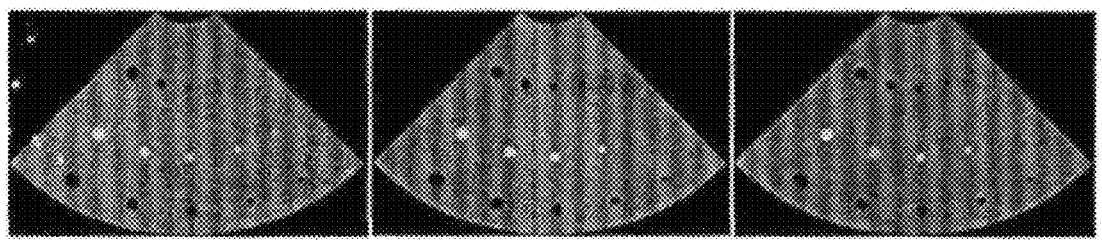
Figure 5:
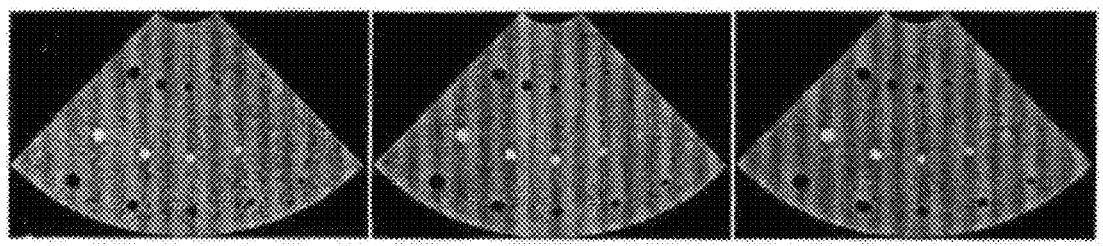
Figure 5:
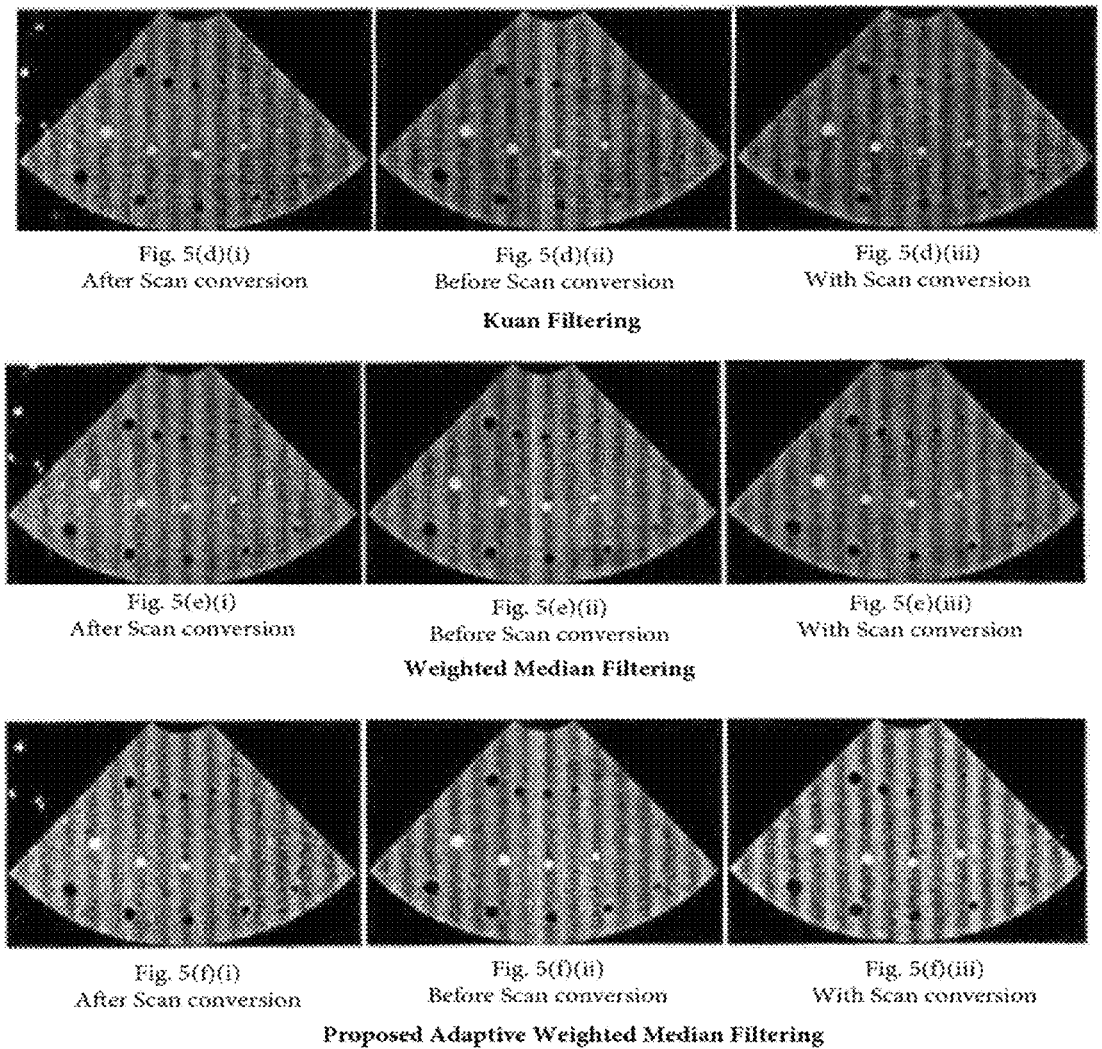
Figure 6:
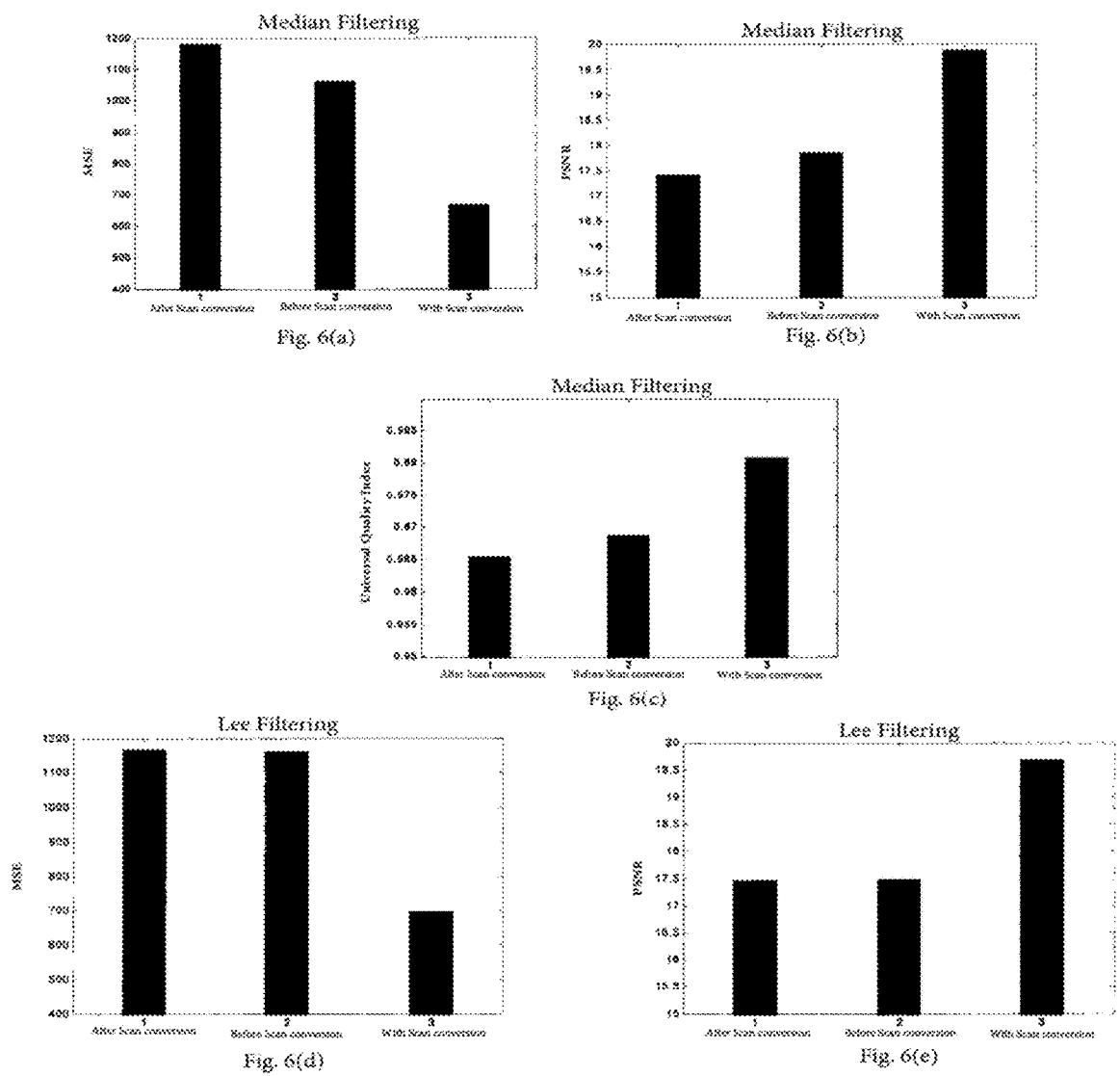
FIG. 6 illustrates plot of Quality metrics of different methods for comparison of performance
Figure 6:
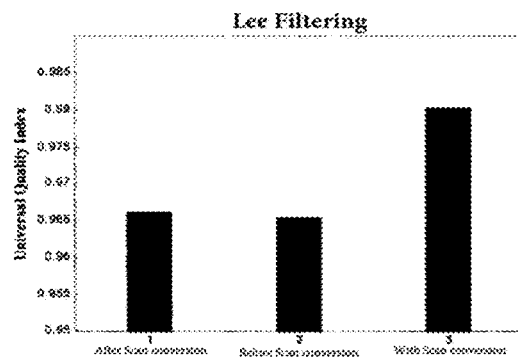
Figure 6:
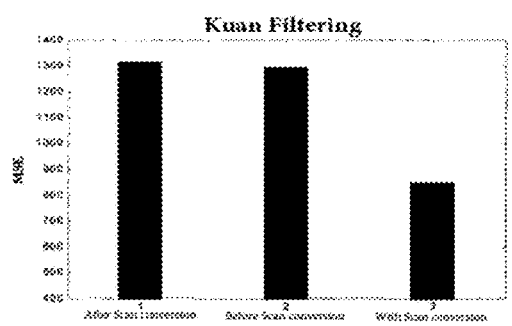
Figure 6:
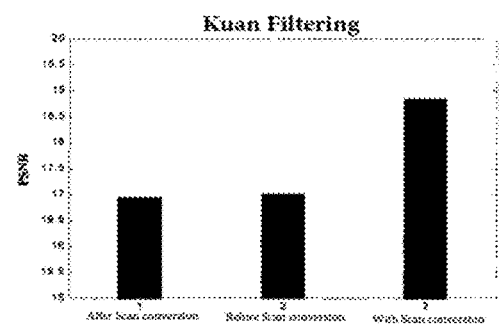
Figure 6:
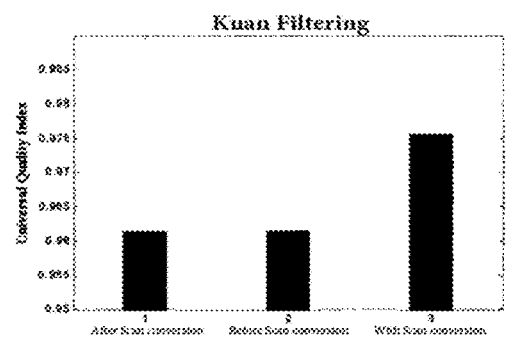
Figures 6, 6O:
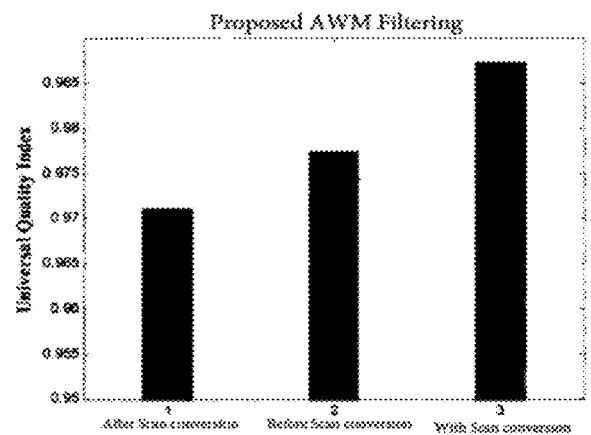

FIG. 5 discloses Simulation results: The reconstructed image of a simulated phantom for each case. The comparisons of quality metrics for the evaluation of the quality of the reconstructed images are shown in FIG. 6 according to table 1.

Figure 7:
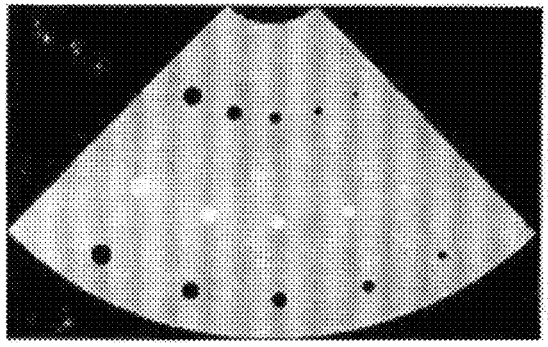
FIG. 7 illustrates SR reconstructed images for different techniques.
Figure 7:
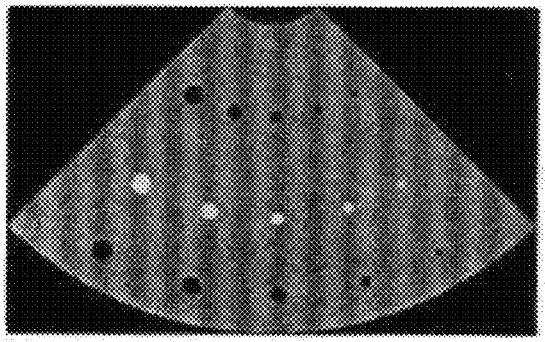
Figure 7:
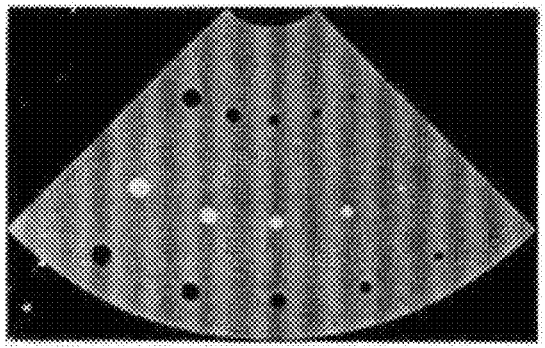
Figure 7:
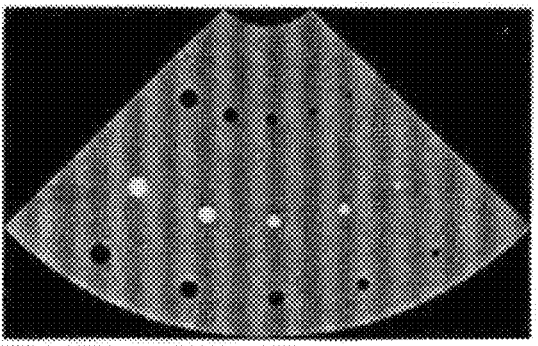
Figure 7:
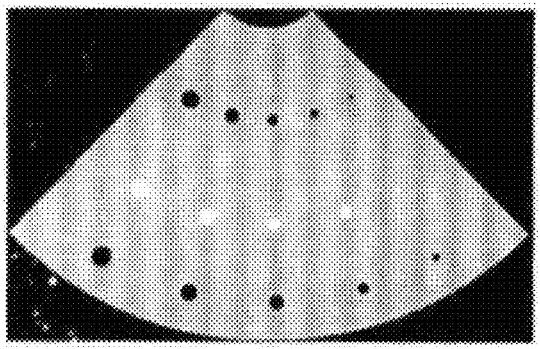
Figure 7:
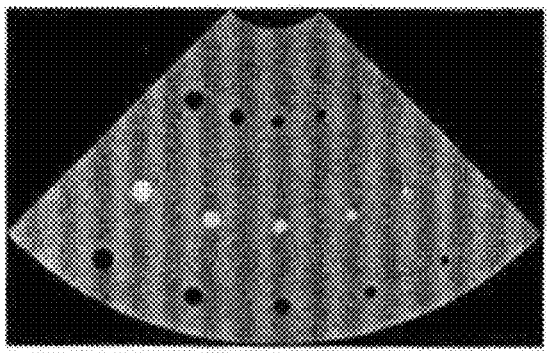
Figure 7:
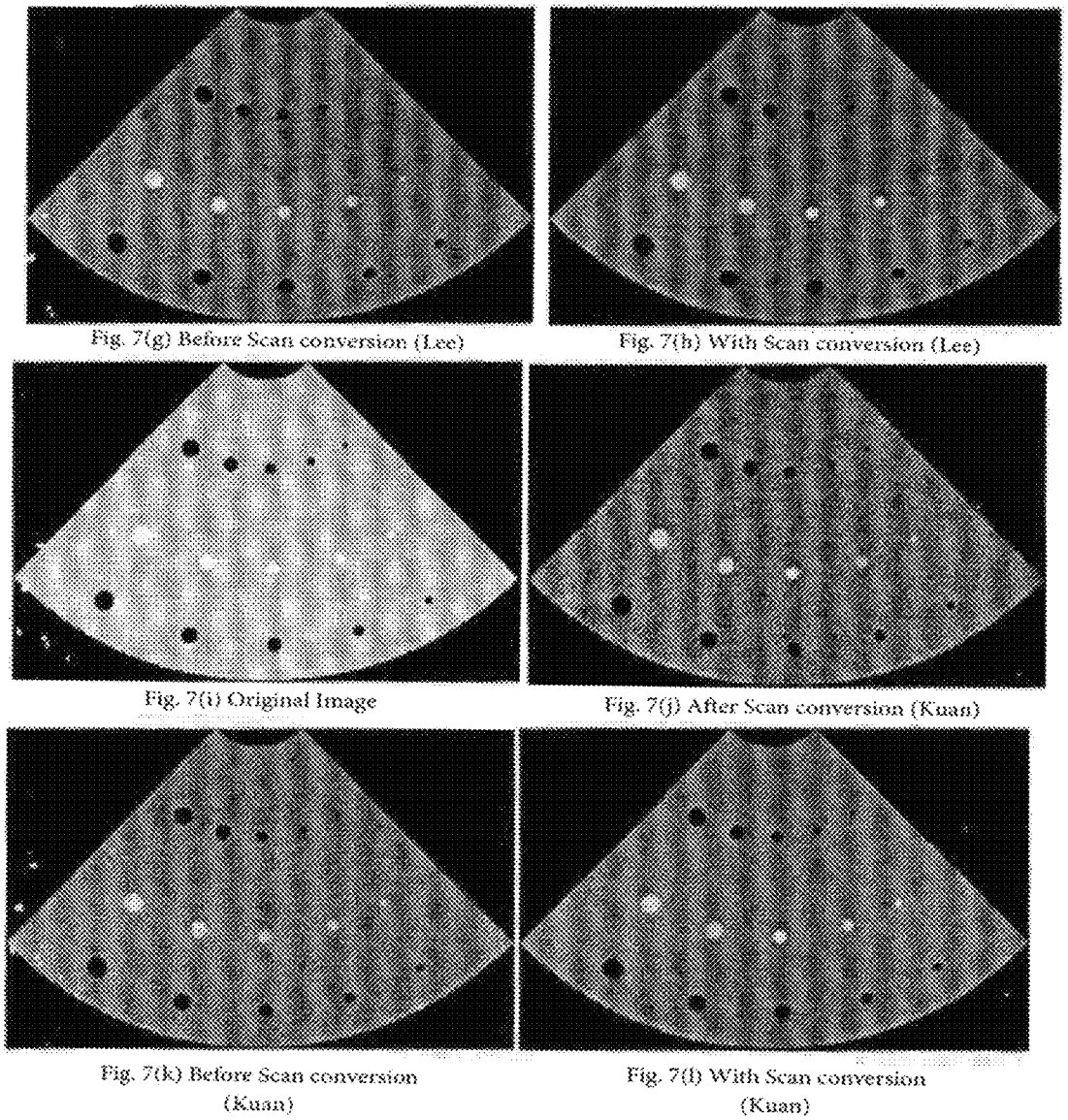
Figure 7:
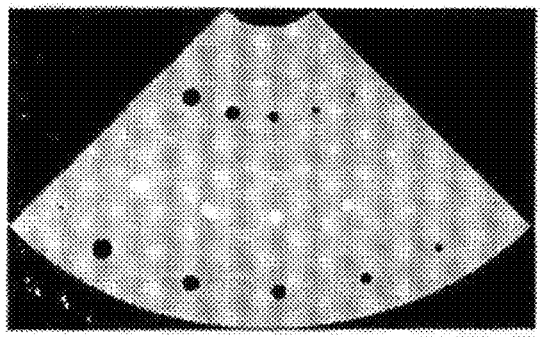
Figure 7:
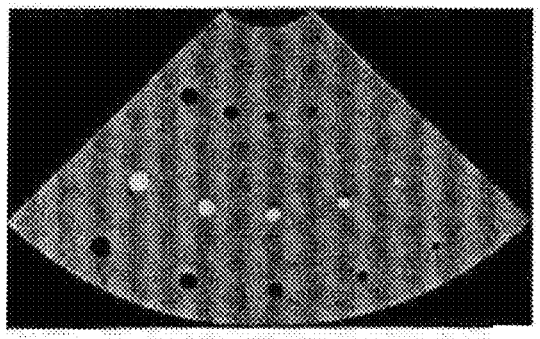
Figure 7:
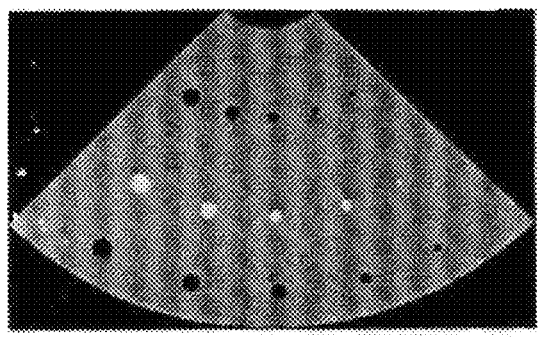
Figure 7:
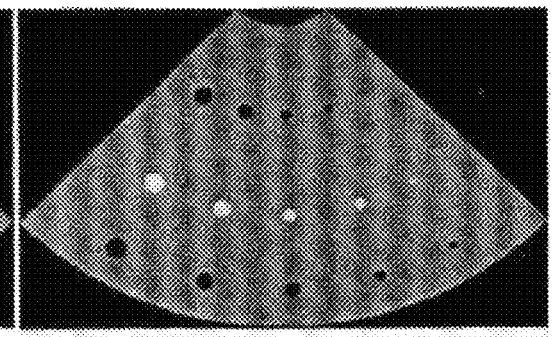
Figure 7:
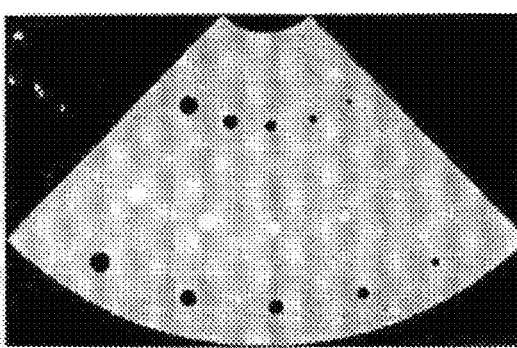
Figure 7:
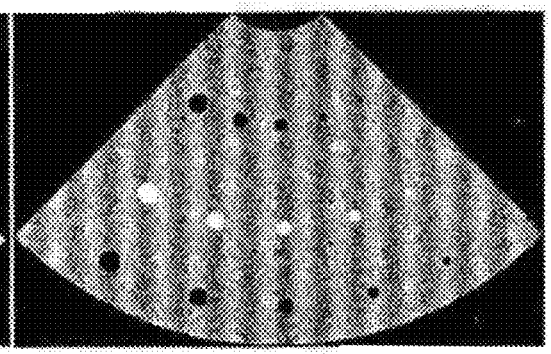
Figure 7:
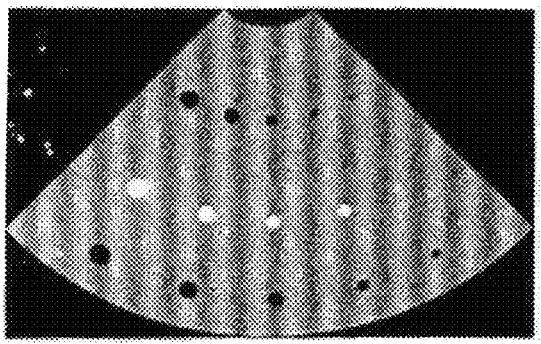
Figure 7:
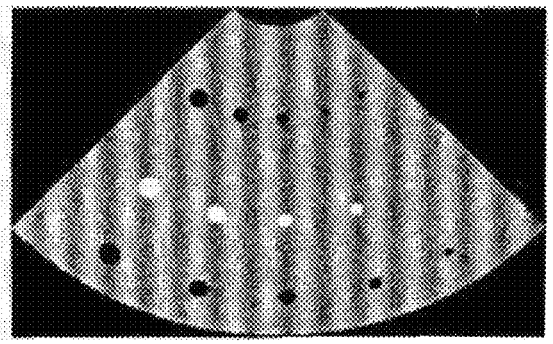
Figure 8:
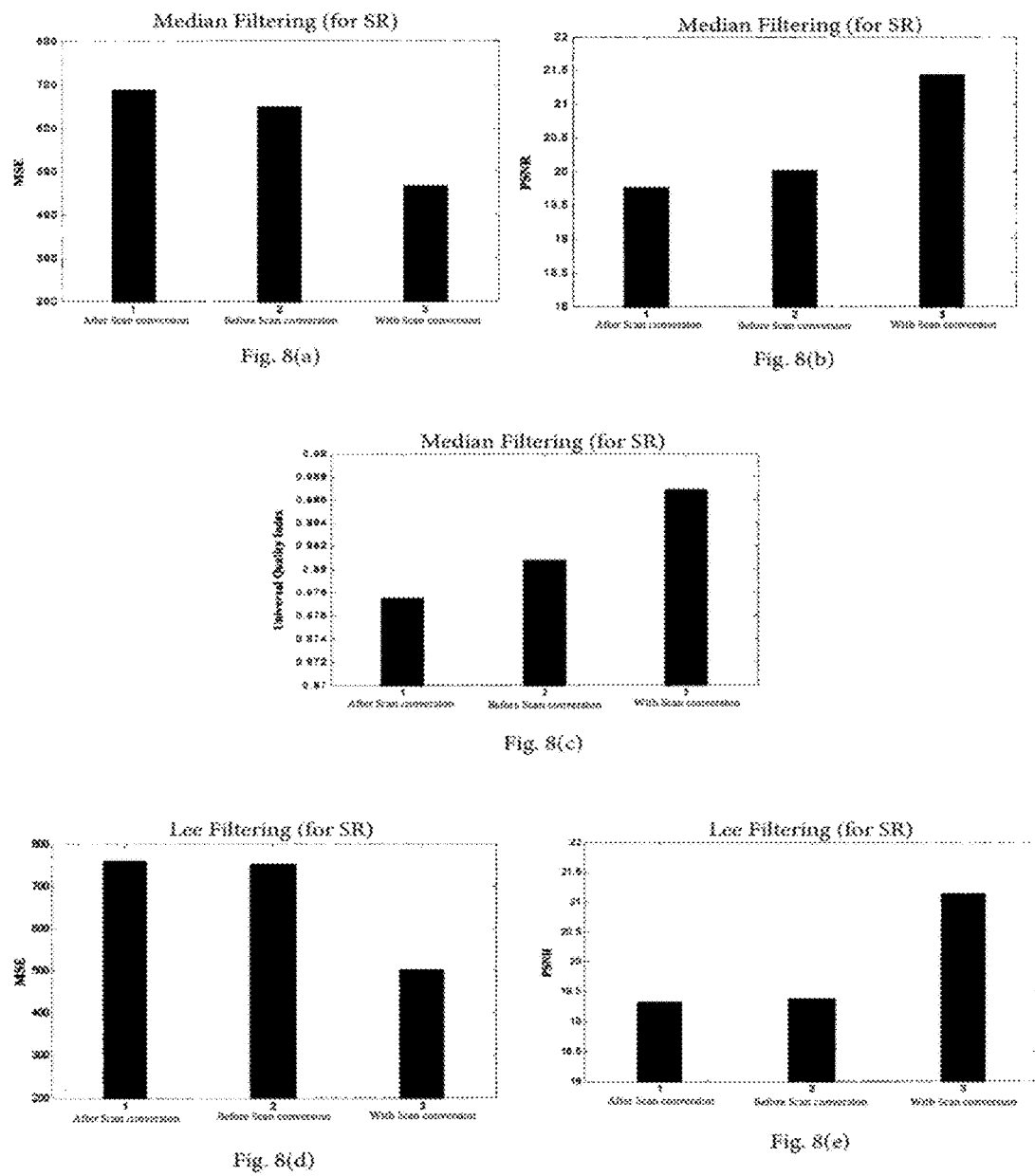
FIG. 8 illustrates Plot of Quality metrics of different speckle reduction methods with SR reconstruction.
Figures 8, 8O:
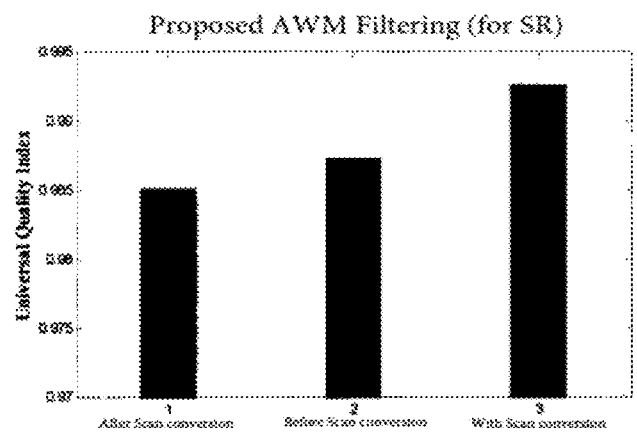

It is observed that the quality of the reconstructed image is the best if filtering and scan conversion are performed simultaneously. This present improved technique also reduces the functional blocks of the ultrasound imaging systems. It is verified that it is also valid in case of super-resolution. SR reconstructed images by the above methods are shown in FIG. 7 and the performance in terms of quality metrics is shown in FIG. 8. Filtering operation for all the reconstructed images is done with 3×3 window.

The present adaptive weighted median filtering technique is also applied to noiseless signal to verify whether the present filter provides a considerable good output or not.

FIG. 9(a) shows the original noiseless image and FIG. 9(b) shows the output of the present filter.

FIG. 12 demonstrate the high-pass filtering with positive slope and negative slope edge enhancement. This algorithm increases the sharpness and the contrast of the image. The parameters $\delta_1$ and $\delta_2$ are the controls parameters which controls the sharpness in the positive and negative slope directions as per requirement.

Since it is high pass in nature, it is able to preserve image details, which is most important criteria in the medical ultrasound image. The negative values of the weights make the filter high pass in nature. The filter preserves both positive and negative-slope edges of the image. The sharpness control factor controls sharpness and the positive and negative-slope edge enhancing capability.

The quality metrics of the output of the present filter with noiseless image is given in table 1.

TABLE 1

| Quality metrics of the output image of the present filter when input image is noise free image | |
|---|---|
| MSE | 71.0386 |
| PSNR | 29.6159 |
| Q | 0.9986 |

The quality metric also confirms that the filter does not hamper much the noise free image.

MSE: Mean Square Error
PSNR: peak signal to noise ratio
Q: Universal quality index The different techniques are compared with the help of quality metrics. The value of the quality metrics imply that the invention provides the better quality of the image and the reconstructed image is closer to the original image than the other methods.

The invention explores a new paradigm where the old popular speckle reduction techniques can be used to obtain better quality of output image. The same equations for Lee, Kuan or Median filtering techniques are used. But they must be used before scan conversion or during scan conversion instead of using them after scan conversion. The MSE, PSNR, Q shows better results when the conventional filtering techniques are used during scan conversion.

Further it is found that the improved AWM based speckle reduction technique which gives better quality of image if it is applied in old popular speckle reduction techniques like Lee, Kuan or Median filtering algorithm.

It is observed that though speckle reduction before scan conversion and during scan conversion performs better than the speckle reduction after scan conversion, the best technique is the speckle reduction during scan conversion. This is because it gives the best noise reduction capability and decrease in computational burden.

Expectedly, the method for speckle reduction in an ultrasound imaging system and system for speckle reduction disclosed herein will find many useful applications in diverse technical fields. Examples of such applications include not only: ultrasound imaging for medical diagnostic and non-destructive evaluation but also SAR imaging, PET/SPECT and other modalities, etc.

It is understood that the systems and methods of the illustrative embodiments may be modified in a variety of ways which will become readily apparent to those skilled in the art, and having the benefit of the novel teachings disclosed herein. All such modifications and variations of the illustrative embodiments thereof shall be deemed to be within the scope and spirit of the present invention as defined by the claims to invention appended hereto.

The invention claimed is:

1. A method for speckle reduction in an ultrasound imaging system, said method comprising steps of:
   receiving, at a processor, data samples comprising image signals with noise from a logarithmic amplifier; and
   processing, via the processor, said image signals by simultaneously performing scan conversion and speckle reduction so as to get a pixel values from said data samples and to perform speckle reduction to provide a speckle filtered output image;
   wherein, said pixel values at raster grid points in a rectangular coordinate system are determined using a speckle reduction by means of speckle reduction filter implemented along with scan conversion; wherein processing of said image signals to get the pixel values at each point where radial lines cut the horizontal grid lines, comprising:
   evaluation a plurality of nearest points on said radial lines with respect to said cut point where one of said plurality of said radial line cuts a one of said horizontal grid line:
   assigning sample values to said nearest points, said sample values lying substantially around said cut point; and
   imposing said speckle reduction by means of a single scale spatial filter to compute a one of said pixel values for said cut point;
   wherein imposing said speckle reduction comprises applying a high pass filter technique with edge enhancement to enhance at least one of positive edge slope or both positive and negative edge slope;
   wherein said high pass filter technique has positive and negative weight co-efficient determined by:

$$w(i, j) = \text{INT}\left[w(K+1, K+1) - d\frac{20 * \log_{10}(1 + m + \sigma)}{\log_{10}(m)}\right]$$

adapted to enhance positive edge slope or both positive and negative edge slope, where m and σ are a local mean and standard deviation inside a 2K+1 by 2K+1 window, d is the distance of the point (i, j) from the center of the window (K+1, K+1), and INT [x] returns the nearest integer to x.

2. The method of claim 1, wherein said step of processing to get the pixel values from the data samples is performed at each of a plurality of points where radial lines cut the horizontal grid lines after:
   determining a plurality of radial lines in said rectangular co-ordinate system; and
   determining a plurality of rectangular grids comprising vertical and horizontal grid lines in said rectangular co-ordinate system.

3. The method of claim 1 wherein said step of processing to get the pixel values from the data samples at each of said raster grid points comprises performing, for each one of said raster grid points:
   receiving said plurality of points where said plurality of radial lines cut said plurality of horizontal grid lines;
   evaluating a plurality of nearest points from said plurality of points where said plurality of radial lines cut said plurality of horizontal grid lines with respect to said one raster grid point;
   assigning sample values to said evaluated nearest points; and
   imposing speckle reduction techniques using a single scale spatial filter technique to compute a one of said pixel values for said one raster grid point.

4. The method of claim 1, wherein said single scale spatial filter technique comprises at least one of a linear filter technique or a non-linear filter technique.

5. The method of claim 1, wherein said step for applying said high pass filter technique to enhance both positive and negative edge slope comprises:
   (i) determining the weight co-efficient for each of the pixel values;
   (ii) evaluating a weighted median of the pixel values within a window using the weight co-efficient adapted to obtain the positive edge slopes;
   (iii) controlling the sharpness in the positive edge slope directions by adjusting a control parameter $\delta_1$ to yield a first image;
   (iv) inverting the pixel values for the window followed by the step (ii) obtain the negative edge slopes;
   (v) controlling the sharpness in the negative edge slope directions by adjusting control parameter $\delta_2$ to yield a second image; and
   (vi) combining the images obtained from step (iii) and step (v).

6. An apparatus for improving speckle reduction in an ultrasound imaging system, said apparatus comprising:
   a processor;
   a computer-readable medium, having stored thereon a plurality of instructions for causing the processor to perform the steps of:
   receiving data samples as an input, the data samples comprising image signals with noises from a logarithmic amplifier; and
   processing said image signals by simultaneously performing scan conversion and speckle reduction so as to get pixel values from said data samples and to perform speckle reduction to provide a speckle filtered output image; and
   wherein said pixel values at raster grid points in a rectangular coordinate system are determined using speckle reduction by means of an improved speckle reduction filter implemented along with scan conversion;
   wherein said step of processing of said image signals to get the pixel values from the data samples is performed at each of a point where radial lines cut the horizontal grid lines, comprising:
   evaluating a plurality of nearest points on said radial lines with respect to said cut point where a one of said plurality of radial line cuts a one of said horizontal grid line;
   assigning sample values to said nearest points, said sample values lying substantially around said cut point; and imposing said speckle reduction by means of a single scale spatial filter to compute a one of said pixel values for said cut point;
wherein imposing said speckle reduction comprises applying a high pass filter technique with edge enhancement to enhance at least one of positive edge slope or both positive and negative edge slope;
wherein said high pass filter technique has positive and negative weight co-efficient determined by:

$$w(i, j) = \text{INT}\left[w(K+1, K+1) - d\frac{20*\log_{10}(1+m+\sigma)}{\log_{10}(m)}\right]$$

adapted to enhance positive edge slope or both positive and negative edge slope, where m and σ are a local mean and standard deviation inside a 2K+1 by 2K+1 window, d is the distance of the point (i, j) from the center of the window (K+1, K+1), and INT [x] returns the nearest integer to x.

7. The apparatus of claim 6, wherein said processing to get the pixel values from the data samples is performed at each of a plurality of points where radial lines cut the horizontal grid lines after:
determining a plurality of radial lines in said rectangular co-ordinate system; and
determining a plurality of rectangular grids comprising vertical and horizontal grid lines in said rectangular co-ordinate system.

8. The apparatus of claim 6 wherein said step of processing to get the pixel values from the data samples at each of said raster grid points comprises performing, for each one of said raster grid points:

receiving said plurality of points where said plurality of radial lines cut said plurality of horizontal grid lines;
evaluating a plurality of nearest points from said plurality of points where said plurality of radial lines cut said plurality of horizontal grid lines with respect to said one raster grid point;
assigning sample values to said evaluated nearest points; and
imposing speckle reduction techniques using a single scale spatial filter technique to compute a one of said pixel values for said one raster grid point.

9. The apparatus of claim 6, wherein said single scale spatial filter technique comprises at least one of a linear filter technique or a non-linear filter technique.

10. The apparatus of claim 1, wherein said applying said high pass filter technique to enhance both positive and negative edge slope further comprises steps of:
determining the weight co-efficient for each of the pixel values;
(ii) evaluating a weighted median of the pixel values within a window using the weight co-efficient to obtain the positive edge slopes;
(iii) controlling the sharpness in the positive edge slope directions by adjusting a control parameter $\delta_1$ to yield a first image;
(iv) inverting the pixel values for the window followed by the step (ii) obtain the negative edge slopes;
(v) controlling the sharpness in the negative edge slope directions by adjusting control parameter $\delta_2$ to yield a second image; and
(vi) combining the images obtained from step (iii) and step (v).

\* \* \* \* \*